(12) United States Patent
Blanco et al.

(10) Patent No.: US 9,952,342 B2
(45) Date of Patent: Apr. 24, 2018

(54) METHODS AND DEVICES FOR ACQUIRING SEISMIC DATA RELATIVE TO AN UNDERGROUND AREA BENEATH THE SEA

(71) Applicants: TOTAL SA, Courbevoie (FR); PHYSEIS CONSULTANT, Lalongue (FR)

(72) Inventors: Jacques Blanco, Lalongue (FR); Ramin Nawab, Pau (FR); Jean-Luc Boelle, Bayonne (FR); Jean-Marc Mougenot, Pau (FR)

(73) Assignees: Total SA, Courbevoie (FR); Physeis Consultant, Lalongue (FR)

( * ) Notice: Subject to any disclaimer, the term of this patent is extended or adjusted under 35 U.S.C. 154(b) by 0 days.

(21) Appl. No.: 14/894,889

(22) PCT Filed: May 15, 2014

(86) PCT No.: PCT/FR2014/051139
§ 371 (c)(1),
(2) Date: Nov. 30, 2015

(87) PCT Pub. No.: WO2014/191650
PCT Pub. Date: Dec. 4, 2014

(65) Prior Publication Data
US 2016/0131786 A1 May 12, 2016

(30) Foreign Application Priority Data
May 30, 2013 (FR) ..................................... 13 54926

(51) Int. Cl.
*G01V 1/38* (2006.01)
(52) U.S. Cl.
CPC ...... *G01V 1/3808* (2013.01); *G01V 2210/127* (2013.01); *G01V 2210/56* (2013.01)

(58) Field of Classification Search
CPC ............. G01V 1/3808; G01V 2210/56; G01V 2210/127
(Continued)

(56) References Cited

U.S. PATENT DOCUMENTS

| 4,935,903 A | 6/1990 | Sanders, I et al. |
| 8,102,731 B2 | 1/2012 | Cambrois |

(Continued)

FOREIGN PATENT DOCUMENTS

| EP | 2 416 179 A2 | 2/2012 |
| WO | WO 84/00215 A1 | 1/1984 |
| WO | WO 2010/023068 A1 | 3/2010 |

OTHER PUBLICATIONS

PCT International Search Report and Written Opinion for PCT/FR2014/051139, dated Nov. 17, 2014, 11 pgs.
(Continued)

*Primary Examiner* — Daniel L Murphy
(74) *Attorney, Agent, or Firm* — Patterson Thuente Pedersen, P.A.

(57) ABSTRACT

In order to acquire seismic data relative to an underground area beneath the sea, seismic waves are emitted in an emission direction forming an angle θ with the vertical using at least one seismic source submerged at a depth d. A seismic signal is collected following the emission of the seismic waves and the propagation of same underground with a view to processing same. In one embodiment of the method, in order to overcome the major problem linked to the depth limit encountered by seismic sources, the processing of the seismic signal comprises a summation of a plurality of terms including the seismic signal and the seismic signal delayed by $\Delta T = 2d \cdot \cos \theta / V$, in which V is the speed of propagation of the seismic waves in water.

27 Claims, 24 Drawing Sheets

(58) Field of Classification Search
USPC .......................................................... 367/21
See application file for complete search history.

(56) References Cited

U.S. PATENT DOCUMENTS 9,519,071 B2 * 12/2016 Berron ................... G01V 1/006
2013/0030709 A1    1/2013 Ferber

OTHER PUBLICATIONS

Preliminary Search Report and Written Opinion for FR application No. 1354926, dated Jan. 23, 2014, 8 pages.
English translation of International Search Report from PCT Application PCT/FR2014/051139, dated Dec. 4, 2014, 3 pgs.
English translation of Written Opinion from PCT Application PCT/FR2014/051139, dated Nov. 30, 2015, 7 pgs.

* cited by examiner

METHODS AND DEVICES FOR ACQUIRING SEISMIC DATA RELATIVE TO AN UNDERGROUND AREA BENEATH THE SEA

RELATED APPLICATIONS

The present application is a National Phase entry of PCT Application No. PCT/FR2014/051139, filed May 15, 2014, which claims priority from FR Patent Application No. 13 54926, filed May 30, 2013, said applications being hereby incorporated by reference herein in their entirety.

FIELD OF THE INVENTION

The present invention relates to seismic techniques used to seek to obtain information regarding the structure and the physical properties of the subsoil. It relates more particularly to the implementation of these seismic techniques in a maritime environment.

BACKGROUND OF THE INVENTION

In a maritime environment, submerged seismic sources, such as for example compressed-air guns, are customarily used.

The seismic wave emitted by a source submerged at a depth d propagates in the water in a substantially spherical manner. The energy sent upwards from the source is reflected specularly at the surface and is superimposed on the seismic energy sent downwards from the source. The coefficient of reflection of the seismic waves at the water-air interface is almost equal to −1, and the reflection gives rise to a change of sign of the pressure wave. That component of the emitted field which is reflected at the surface is similar, apart from the sign, to what would be emitted by a ghost source situated vertically in line with the source and at a distance d above sea level.

FIG. 1 illustrates this phenomenon, with the vertical direction z denoting the depth and the horizontal direction x a spatial coordinate parallel to the surface of the sea. The seismic signal emitted from the submerged source 10 in a direction forming an angle θ with the vertical has, at the level of a wave surface $\Sigma_t$ some distance from the source, a direct component S(t) propagated downwards from the source 10 and a ghost component −S(t−ΔT) which has undergone the reflection on the water-air surface M as if it had been emitted from the ghost source 10'. The ghost component exhibits with respect to the direct component a delay ΔT which depends on the angle θ, i.e. ΔT=2d·cos θ/V, where V is the speed of propagation of the seismic waves in the water.

Some distance from the source, the seismic amplitude which propagates along the direction θ may be then written:

$$S_1(t)=S(t)-S(t-\Delta T) \quad (1)$$

The ghost's presence related to the surface reflection affects the spectrum of the propagated seismic signal $S_1$. If we represent an ideal source emitting a Dirac pressure pulse, that is to say with a flat spectrum, the superposition of the reflected wave brings about:

zeros or notches in the spectrum at the frequencies which are a multiple of 1/ΔT;

attenuation of the low frequencies, which is considered to be prejudicial since the information extracted from the measurements at the lowest frequencies is very rich, in particular for advising regarding the speeds of propagation of the waves in the soil.

FIG. 2 illustrates the same phenomenon as FIG. 1 in a case where θ=0, with the depth z represented by the vertical direction and the time t represented by the horizontal direction. A Dirac pulse emitted by the source 10 arrives at a depth z under the source at an instant t, while its echo due to the ghost, of opposite sign, arrives at the same depth z with the delay ΔT.

FIG. 3 shows spectra, obtained by calculation, of the signal emitted in the vertical direction (θ=0) for source depths, d, of 5 m (curve 11), of 10 m (curve 12) and of 20 m (curve 13). The shallow sources have the advantage of rejecting the notches toward the high frequencies, while, however, attenuating the low frequencies fairly strongly.

It is possible to seek to improve the behavior at low frequencies by increasing the depth of the source. However, the notches are then at lower frequencies. Furthermore, underwater seismic sources have diminished energy efficiencies and degraded frequency contents as the depth increases, because of the effect of the hydrostatic pressure.

In order to regulate the emission spectrum, it is known to activate several sources situated at different depths. For example, in the case of FIG. 3, the activation of the three sources at depths of 5, 10 and 20 m gives rise to a spectrum represented by curve 14, resulting from the sum of the spectra represented by curves 11, 12 and 13, which shows a steeper slope at the low frequencies and zeros aligned with those of the shallowest source. This is not perfect since the resulting spectrum is not flat. However, this is a sharp improvement. A judicious choice of the depths of the combined sources makes it possible to best circumvent the notches while preserving content at the very low frequencies.

A technique making it possible to put the effect of the ghost into further perspective consists in triggering each source placed at a given depth at the moment at which the signal of the source situated just above it reaches it. Thus, the primary wave field emitted downwards is put back into phase despite different source depths. Therefore, the primary wave fields of each of the sources interfere constructively whereas this is not the case for the ghosts.

In another approach, the sources of one and the same set are grouped together in clusters each positioned at a different depth, the set of these clusters being triggered in a maximum timescale of a second, thus making it possible to preserve a stationary emission.

It has been proposed to improve the emission spectrum by disposing a screen of gas bubbles between the source and the surface so as to decrease the reflection coefficient, thereby improving the behavior at low frequencies and limiting the sagging of the spectrum in the notches. FIG. 4 thus shows the effect on the spectrum of a reflection coefficient r of 0.7. Curves 21, 22, 23 and 24 of FIG. 4 have been calculated with sources disposed like those which gave rise to curves 11, 12, 13 and 14 in FIG. 3, respectively. It is seen that the attenuation of the reflection coefficient r boosts the lowest frequencies (A). However, the drawback of this technique is that it is very complex to implement, and the improvement in performance remains limited.

A major problem encountered by all the techniques proposed to date remains the limit in terms of depth imposed on the sources, thereby greatly reducing the possibility of finding sufficient low frequencies in the signal spectrum.

An object of the present invention is to reduce the incidence of this problem and more generally to improve the spectral content of the seismic signal emitted utilized in measurements performed on the basis of one or more submerged sources.

SUMMARY OF THE INVENTION

There is thus proposed a method for emitting seismic waves in a maritime environment along a direction of emission forming an angle θ with the vertical, with the aid of at least one submerged seismic source, the method comprising:
performing a first firing from a first emission position submerged at a depth $d_1$; and
performing a second firing from a second emission position submerged at a depth $d_2$, with a delay equal to $(d_1+d_2) \cdot \cos \theta / V$ with respect to the first firing, where V is the speed of propagation of the seismic waves in the water.

In a particular embodiment, the first and second emission positions are merged, or situated at one and the same depth d ($d_1=d_2=d$) in one and the same Fresnel zone in relation to the emitted seismic waves.

The first firing can be repeated k−1 times at the same depth or at different depths, with judiciously chosen delays, k being an integer greater than 2. It is thus possible to perform an $i^{th}$ firing from an $i^{th}$ emission position submerged at a depth $d_i$, with a delay equal to $(d_{i-1}+d_i) \cdot \cos \theta / V$ with respect to the $(i-1)^{th}$ firing, for each integer i lying between 2 and k.

Again, the k emission positions can, without this being limiting, be merged, or situated at one and the same depth d ($d_1=d_2=\ldots=d_k=d$) in one and the same Fresnel zone in relation to the emitted seismic waves.

In an embodiment, the direction of emission is vertical, that is to say θ=0. The invention is then usable, in particular, to carry out vertical seismic profiles ("VSP"). However, inclined directions (θ≠0) are also possible.

The method rests upon a totally different approach to what has been done or proposed up till now. The second firing is synchronized with the ghost of the first firing so as to defer it in time. This amounts to placing a virtual source at a greater depth, without having the constraints of a more significant hydrostatic pressure.

Thus the method makes it possible to circumvent the major problem encountered hitherto, namely the maximum depth limit imposed on the sources. It is possible, just as for conventional configurations, to use several energy sources equivalent to that of the ghost. These sources can be placed, physically and/or virtually, at various depths and they can be combined in an optimal manner.

It is not indispensable to employ sources with very fast firing rates. It is for example possible to apply a firing sequence at periodic repetitions with the same source, on each occasion allowing the source time to regain its optimal chamber pressure.

A way of reducing the firing rate consists in placing several small sources at the same depth. This type of implementation makes it possible, if the number of repeated firings is sufficient, to obtain an appreciable gain in terms of very low frequencies without the necessity to use a deflector between the sources and the surface.

According to another aspect, a method for acquiring seismic data relating to a subsoil zone situated under the sea comprises:
emitting seismic waves along a direction of emission forming an angle θ with the vertical, with the aid of at least one submerged seismic source;
gathering a seismic signal subsequent to the emission of the seismic waves and to their propagation in the subsoil; and
processing the seismic signal.

According to this method for acquiring seismic data, the emission of the seismic waves comprises k successive firings, where k is an integer greater than 1, including a first firing performed at a depth $d_1$ and k−1 subsequent firings at respective depths $d_2, \ldots d_k$, and for each integer i lying between 2 and k, the $i^{th}$ firing is performed with a delay of $(d_{i-1}+d_i) \cdot \cos \theta / V$ with respect to the $(i-1)^{th}$ firing, where V is the speed of propagation of the seismic waves in the water.

In this mode of acquisition of the seismic data, the deletion of the ghost occurs at the level of the emission of the seismic waves, with the aid of the emission method set forth above.

An advantageous embodiment consists in applying the same principle of deleting the ghost not at the level of the emission but at the level of the processing of the signal on the basis of a single firing or of a restricted number of firings.

There is thus proposed a method for acquiring seismic data relating to a subsoil zone situated under the sea, the method comprising:
emitting seismic waves along a direction of emission forming an angle θ with the vertical, the emitted seismic waves comprising at least one emission sequence generated with the aid of at least one submerged seismic source, each emission sequence having an associated depth;
gathering a seismic signal subsequent to the emission of the seismic waves and to their propagation in the subsoil, the gathered seismic signal comprising a reception sequence corresponding respectively to each emission sequence; and
processing the seismic signal, the processing of the seismic signal comprising, for each reception sequence corresponding to an emission sequence, a summation of several terms which include the seismic signal of said reception sequence and the seismic signal of said reception sequence delayed by $\Delta T = 2D \cdot \cos \theta / V$, where V is the speed of propagation of the seismic waves in the water and D is the depth associated with said emission sequence.

An emission sequence of the seismic waves can consist of a single firing performed with the seismic source submerged at a depth d equal to the depth D associated with this emission sequence (d=D).

Another possibility is that an emission sequence is composed of k successive firings (k>1) positioned temporally with respect to one another according to the principle set forth above so as to reproduce the behavior of a virtual source of depth D. The k firings include in this case a first firing performed with a seismic source submerged at a depth $d_1$ and k−1 subsequent firings with seismic sources submerged at respective depths $d_2, \ldots d_k$. The k firings of this emission sequence are coordinated in such a way that, for each integer i lying between 2 and k, the $i^{th}$ firing of the emission sequence is performed with a delay of $(d_{i-1}+d_i) \cdot \cos \theta / V$ with respect to the $(i-1)^{th}$ firing of the sequence. The depth D associated with such an emission sequence is then the sum of the k depths $d_1, d_2, \ldots, d_k$.

In the particular case where the k coordinated firings are performed by one or more sources at one and the same depth d ($d_1=d_2=\ldots=d_k=d$), we have D=k·d.

In an embodiment, seismic sources are submerged at n different depths, where n is an integer greater than 1, and several independent seismic wave emission sequences are successively produced with the aid of these seismic sources and are associated with different depths D. It is in particular possible to produce $2^n-1$ independent seismic wave emission sequences with the aid of the seismic sources submerged at n different depths, these $2^n-1$ emission sequences including, for each integer i lying between 1 and n, $C_n^i=n!/[i!(n-i)!]$ independent emission sequences each consisting of i coordinated firings from i sources situated at different depths.

In an embodiment, the summed terms for a reception sequence comprise the seismic signal of this reception sequence and k−1 copies of this same seismic signal having delays respectively equal to $i \cdot \Delta T$ for i=1, 2, . . . , k−1, where k is an integer greater than 1.

The ghost of the primary emission sequence is thus canceled, at the level of the processing of the signal, so as to simulate the behavior of a source of depth $k \cdot D$.

The summation can be further extended by contriving matters so that the summed terms for a reception sequence comprise n times the seismic signal of this reception sequence and, for each integer i lying between 1 and n−1, n−i copies of this same seismic signal delayed by $i \cdot \Delta T$, where n is an integer greater than 1. In the absence of noise and assuming the reflections to be perfect, the processing of the signal then makes it seem as if seismic waves had been emitted from n sources situated at depths D, 2D, 3D, . . . , n·D, while in fact making do with a single firing, actual or virtual, at the depth D.

Noise may limit the performance of the above method. To remedy this, provision may be made for the emission of the seismic waves to comprise several (for example from 5 to 20) independent emission sequences each associated with a respective depth $D_1, D_2, \ldots D_p$, where p>1 is the number of sequences. In the particular case where $D_1=D_2= \ldots =D_p=D$, the independent emission sequences are carried out at the same depth. The gathering of the seismic signal can then comprise the recording of p reception sequences respectively subsequent to the p emission sequences, and the processing of the seismic signal can comprise the respective summation of said terms for each of the p reception sequences recorded and a combining of the p sums obtained.

An embodiment of the method for acquiring seismic data furthermore comprises:
measuring the seismic waves emitted by a hydrophone submerged under the seismic source or sources while being aligned along the direction of angle θ;
applying to the seismic waves measured by the hydrophone a summation processing identical to that applied to the seismic signal;
verifying a convergence criterion on a signal resulting from the processing applied to the seismic waves measured by the hydrophone; and
stopping the emission sequences when the convergence criterion is satisfied.

Another aspect of the present invention pertains to a device for processing a seismic signal gathered subsequent to the emission of the seismic waves with the aid of at least one submerged seismic source and to the propagation of the seismic waves in the subsoil, the seismic waves having been emitted along a direction of emission forming an angle θ with the vertical and in the form of at least one emission sequence associated with a respective depth, the gathered seismic signal comprising a reception sequence corresponding respectively to each emission sequence. The device comprises a processor for summing several terms which include the seismic signal of a reception sequence corresponding to an emission sequence and the seismic signal of this same reception sequence delayed by $\Delta T=2D \cdot \cos \theta/V$, where V is the speed of propagation of the seismic waves in the water and D is the depth associated with said emission sequence.

Yet another aspect of the present invention pertains to a computer program for such a seismic signal processing device, the program comprising instructions for, when it is executed on a processor of said device, summing several terms which include the seismic signal of a reception sequence corresponding to an emission sequence and the seismic signal of this same reception sequence delayed by $\Delta T=2D \cdot \cos \theta/V$, where V is the speed of propagation of the seismic waves in the water and D is the depth associated with said emission sequence. There is further proposed a recording medium readable by computer, on which such a computer program is recorded.

BRIEF DESCRIPTION OF THE DRAWINGS

Other features and advantages of the present invention will become apparent in the description hereinafter of a nonlimiting exemplary embodiment, with reference to the appended drawings in which.

DETAILED DESCRIPTION OF THE DRAWINGS

Returning to equation (1) hereinabove, it is seen that by repeating the firing at the same source position with a delay $\Delta T$, a seismic amplitude $S_2(t)$ given by:

$$S_2(t)=S_1(t)+S_1(t-\Delta T)=S(t)-S(t-2\Delta T) \quad (2)$$

is generated along the direction $\theta$.

From the point of view of the ghost phenomenon, the repetition of the firing with the appropriate delay amounts to creating a virtual source of depth $2d$.

The process can be repeated to simulate a source of depth $k \cdot d$ by repeating $k-1$ times the initial firing from the same depth with delays $i \cdot \Delta T$ for $i$ ranging from 1 to $k-1$:

$$S_k(t)=S_1(t)+\Sigma_{i=1}^{k-1} S_1(t-i \cdot \Delta T)=\Sigma_{i=0}^{k-1} S_1(t-i \cdot \Delta T)=S(t)-S(t-k \cdot \Delta T) \quad (3)$$

Let us consider on the other hand two sources $10_1$, $10_2$ with the same characteristics, with respective depths $d_1$, $d_2$ and with the same horizontal position (or situated in the same Fresnel zone). If these two sources $10_1$, $10_2$ are triggered with, for the second source $10_2$, a delay $(\Delta T_1+\Delta T_2)/2=(d_1+d_2)\cdot\cos\theta/V$ with respect to the first source $10_1$, then the second source is synchronized with the arrival of the ghost of the first along the direction $\theta$. In the above expression, $\Delta T_i=d_i\cdot\cos\theta/V$ designates the delay of ghost associated with a source of depth $d_i$. Along the direction $\theta$, the primary emission of the second source $10_2$ cancels the ghost of the first source $10_1$.

Figure 2:
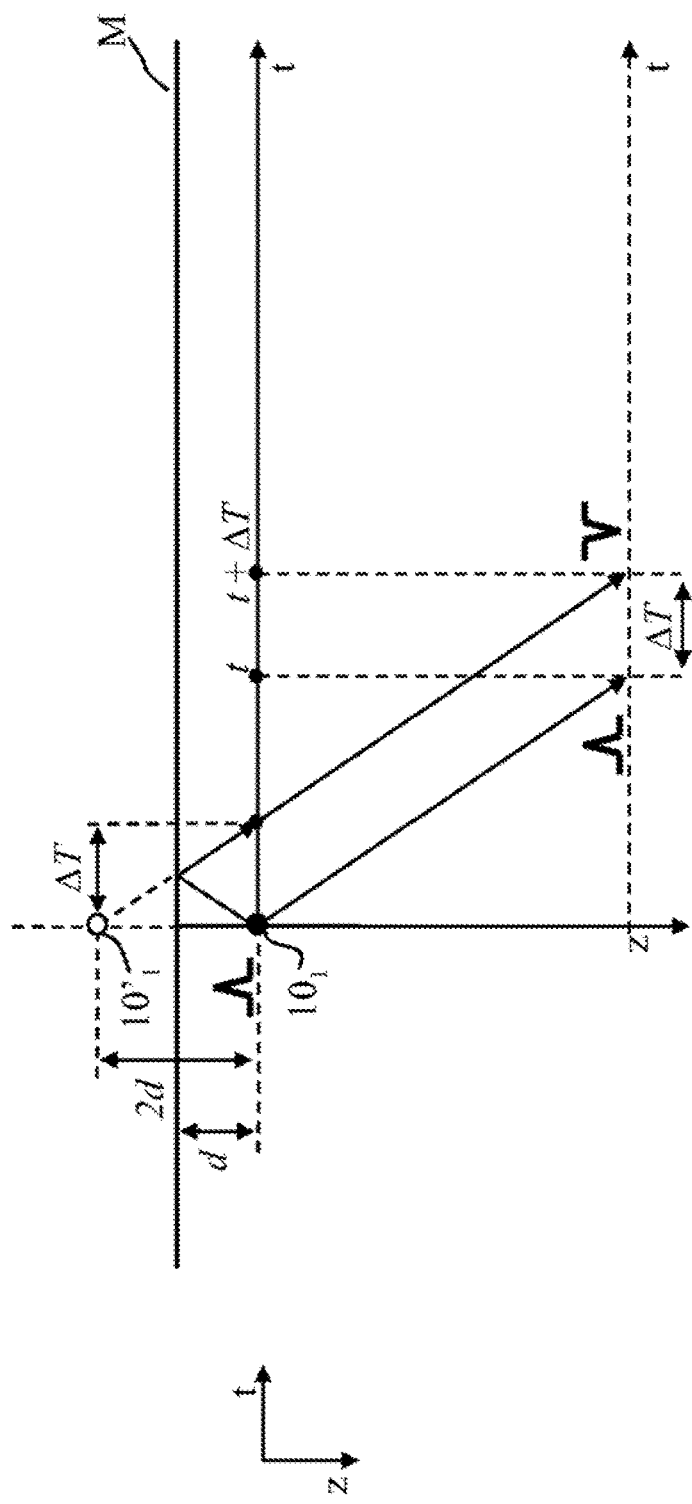
Figure 5:
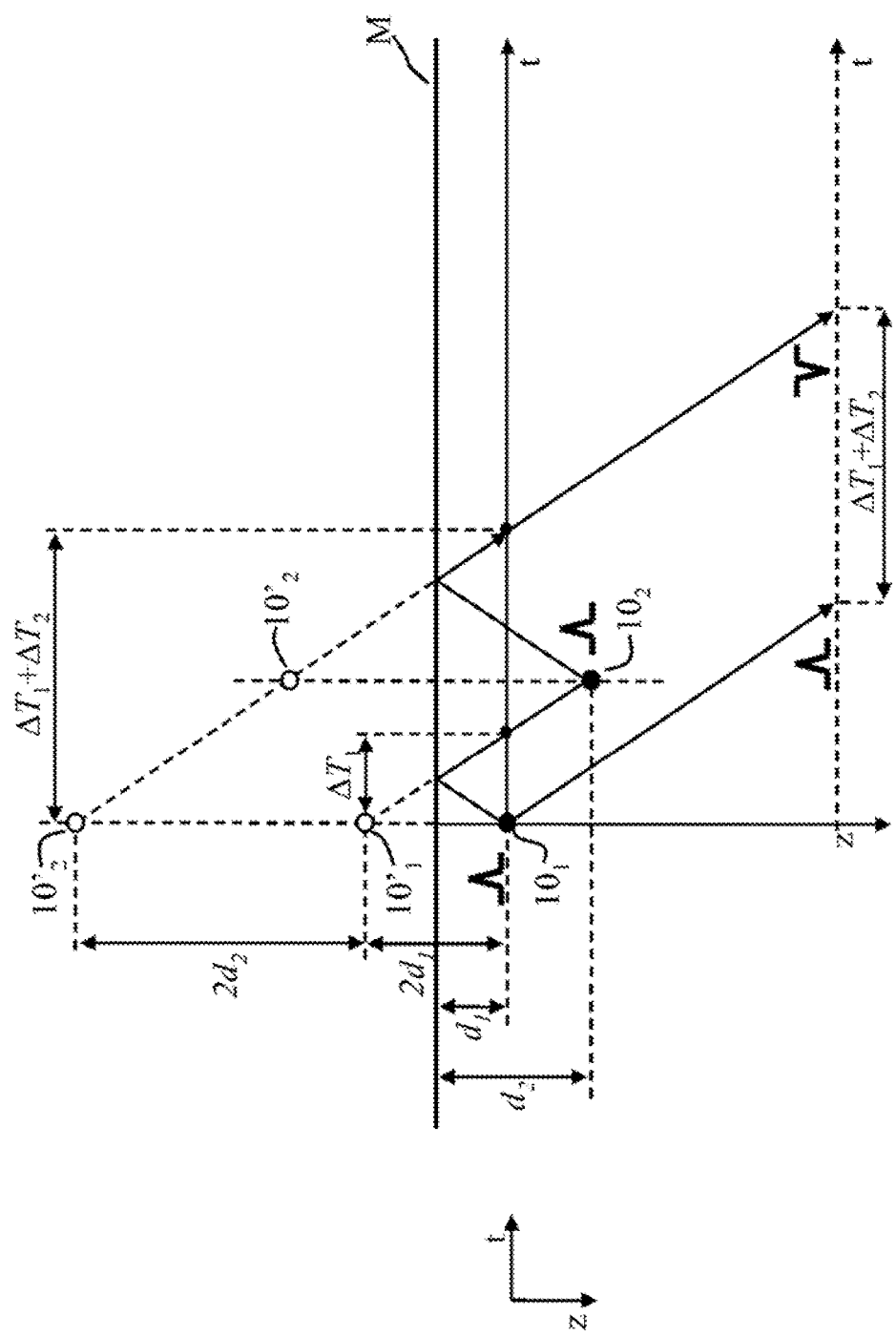
FIG. 5 is a diagram analogous to that of FIG. 2, illustrating a phase of acquiring seismic data in a maritime environment with two sources at different depths.

This is what is illustrated in FIG. 5 which is similar to FIG. 2 with two sources $10_1$, $10_2$ whose ghosts are symbolized as $10'_1$, $10'_2$. The primary emission of the second source $10_2$ erases the ghost of the first $10_1$, and it is as if the ghost were delayed by $\Delta T_1+\Delta T_2$, instead of $\Delta T_1$ if there had been the first source $10_1$ only. The seismic amplitude $S_2(t)$ generated along the direction $\theta$ with the two sources $10_1$, $10_2$ thus shifted in time is given by:

$$S_2(t)=S(t)-S(t-(\Delta T_1+\Delta T_2))=S(t)-S[t-2(d_1+d_2)\cdot\cos\theta/V] \quad (4)$$

It is noted that equation (2) is a particular case of equation (4) when $d_1=d_2=d$.

Figure 6:
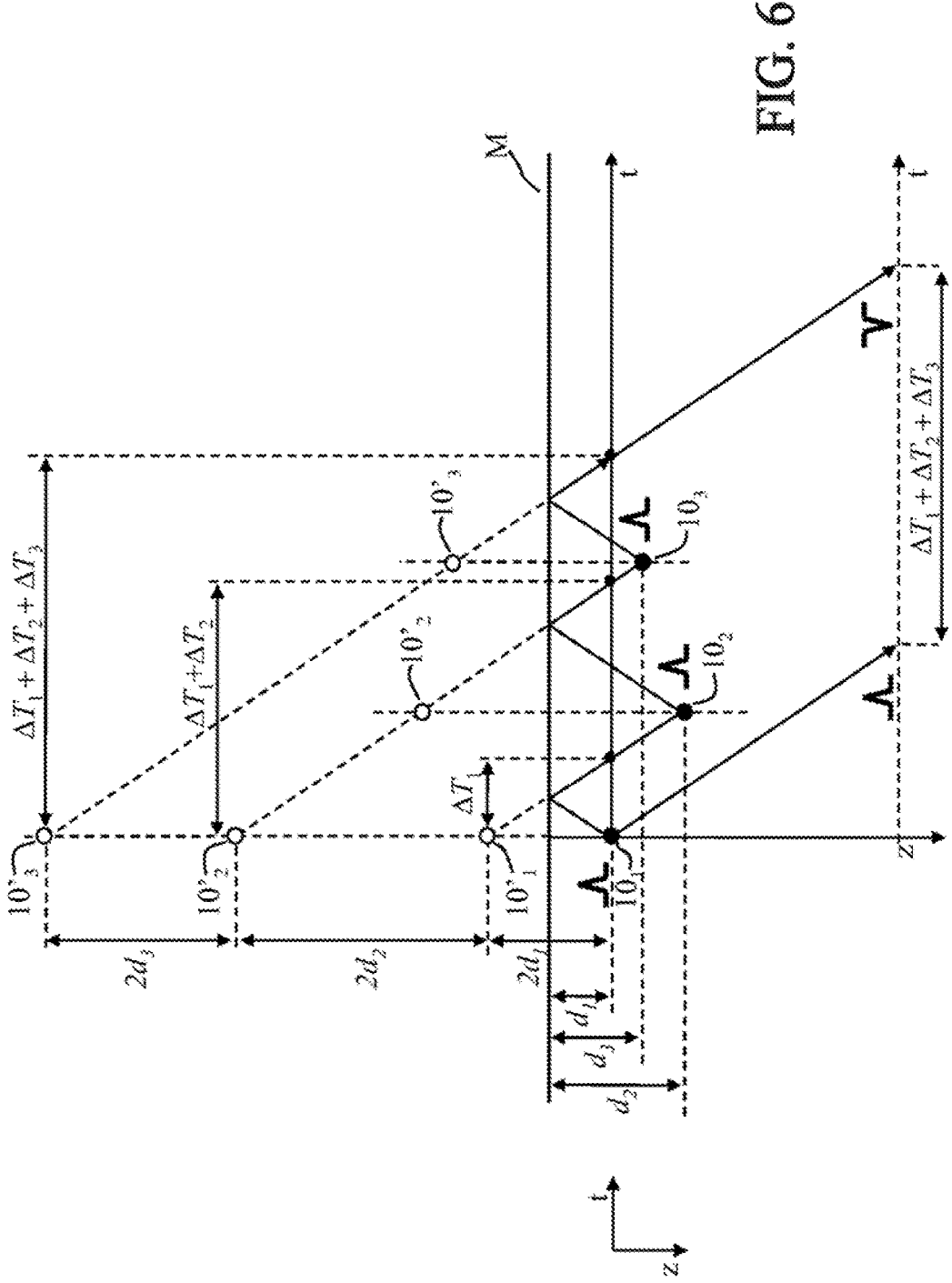
FIG. 6 is a diagram analogous to that of FIG. 5, illustrating a phase of acquiring seismic data in a maritime environment with three sources at different depths.

Equation (4) is generalizable to the case of k sources $10_1$, $10_2$, $10_k$ of respective depths $d_1, d_2, \ldots, d_k$, where $k$ designates an arbitrary integer greater than 1. This is what is illustrated in FIG. 6 in the particular case where $k=3$ and $\theta=0$, with ghost sources $10'_1, 10'_2, \ldots, 10'_k$ above the level M of the sea. If, for each integer i such that $2 \leq i \leq k$, the $i^{th}$ source $10_i$ performs a firing at its emission position of depth $d_i$ with a delay $(\Delta T_{i-1}+\Delta T_i)/2=(d_{i-1}+d_i)\cdot\cos\theta/V$ with respect to the $(i-1)^{th}$ firing performed by the $(i-1)^{th}$ source $10_{i-1}$ at the emission position of depth $d_{i-1}$, the ghost is deferred in time so as to generate along the direction $\theta$ a seismic amplitude $S_k(t)$ given by:

$$S_k(t)=S(t)-S[t-2(\Sigma_{i=1}^k d_i)\cdot\cos\theta/V]=S(t)-S[t-\Sigma_{i=1}^k \Delta T_i] \quad (5)$$

With the k sources $10_1$, $10_2$, ..., $10_k$ thus coordinated, it is as if a virtual source had been placed at the depth $D=\Sigma_{i=1}^k d_i$.

It may further be noted that equation (3) is a particular case of equation (5) when $d_1=d_2=\ldots=d_k=d$, and that equation (4) is a particular case of equation (5) when $k=2$.

Figure 3:
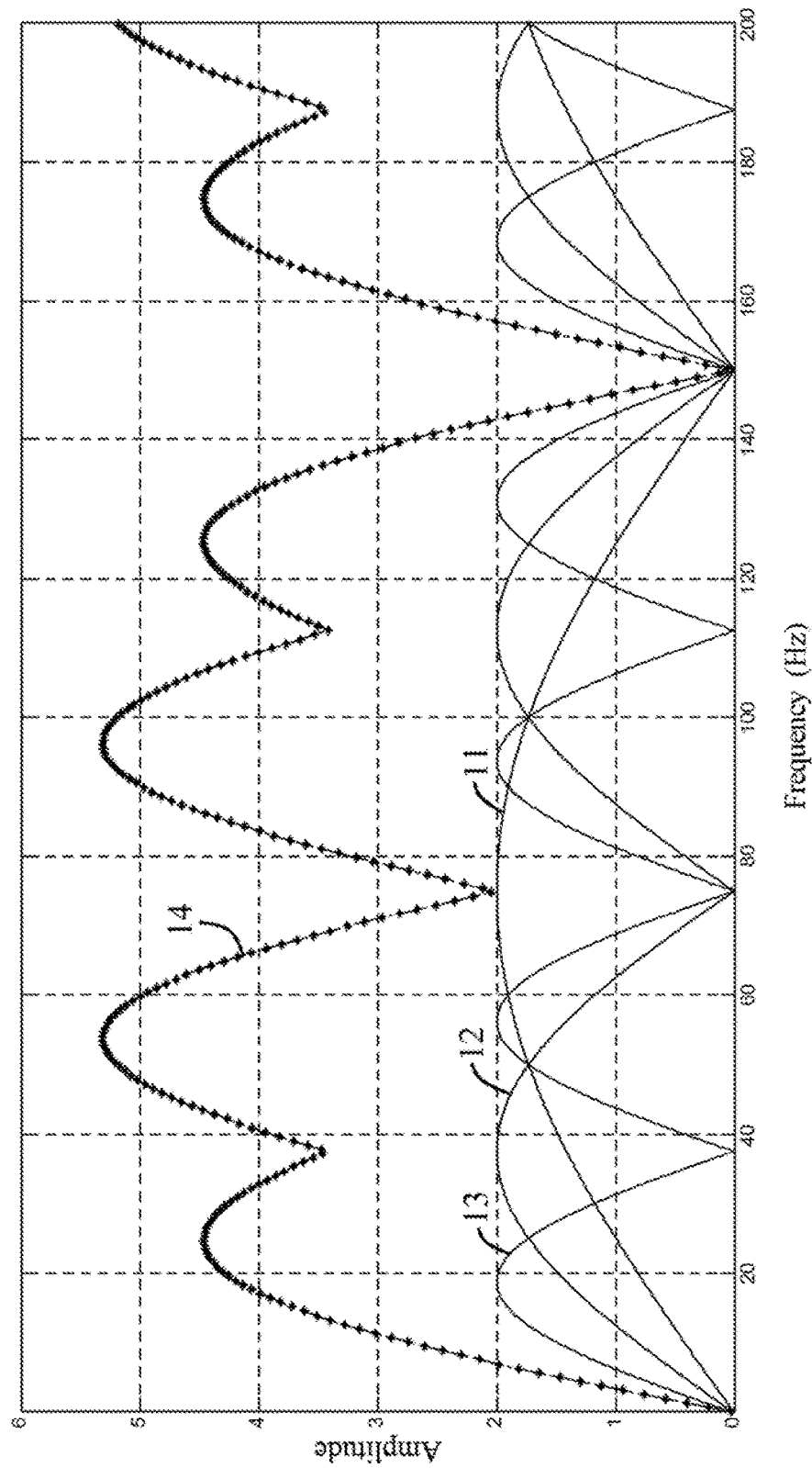
FIGS. 3 and 4, previously commented on, are graphs showing spectra generated along a direction θ with the aid of seismic sources submerged at various depths, with respective reflection coefficients of −1 and −0.7 at the surface.
Figure 7:
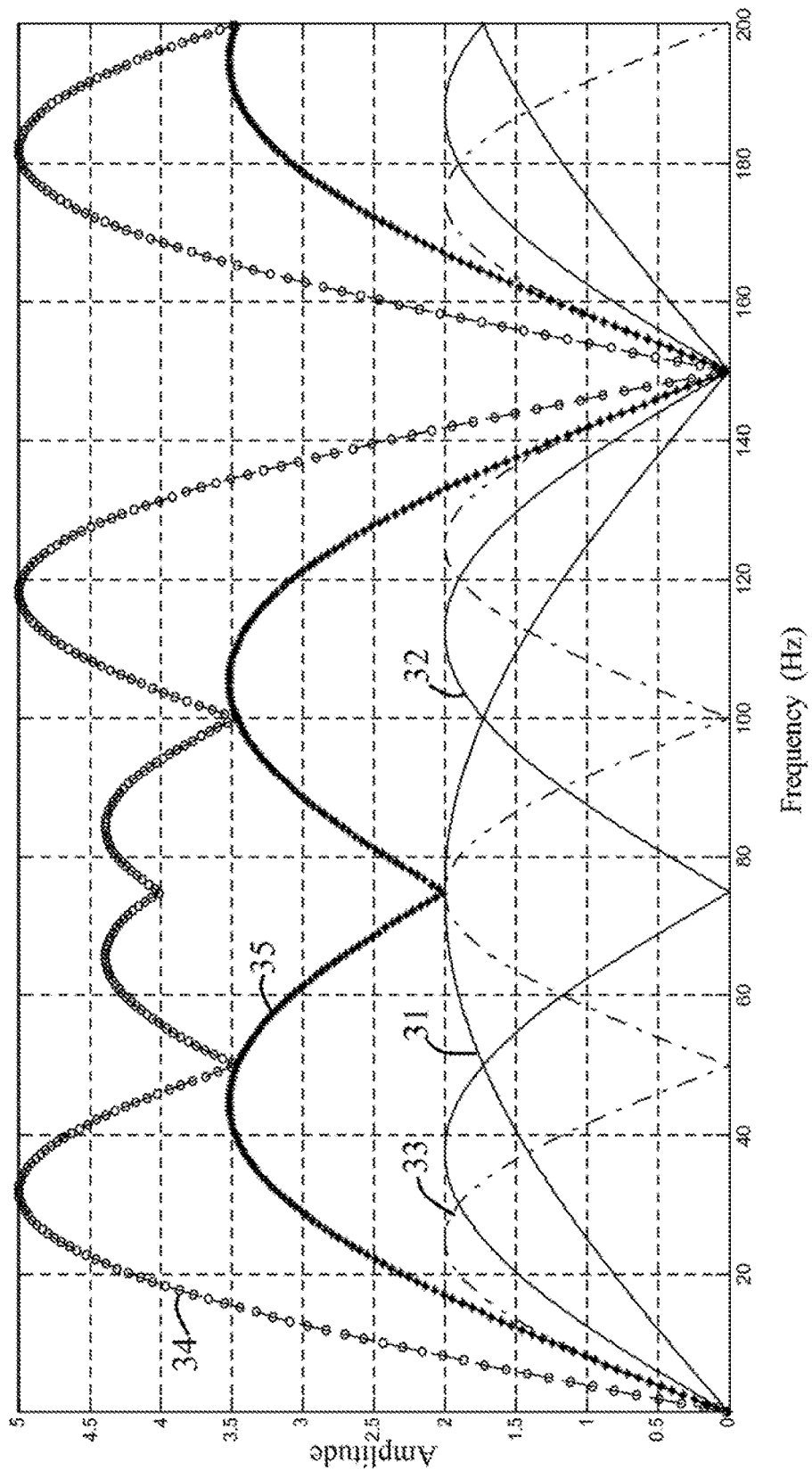
FIG. 7 is a graph showing spectra generated along a direction θ with the aid of two seismic sources submerged at different depths.

FIG. 7 shows spectra obtained by calculation in a similar manner to those of FIG. 3 ($\theta=0$). Curve 31 corresponds to the spectrum emitted from a source $10_2$ submerged at the depth $d_2=5$ m, curve 32 to the spectrum emitted from a source $10_1$ submerged at the depth $d_1=10$ m, and curve 33 to the spectrum that would be emitted by a virtual source at a depth $d_1+d_2=15$ m. This spectrum 33 is that which is obtained with a first firing from the source $10_1$ of depth $d_1=10$ m followed by a second firing delayed by $(\Delta T_1+\Delta T_2)/2=(d_1+d_2)/V$ from the source $10_2$ of depth $d_2=5$ m.

If one is capable of aggregating a first firing at the depth $d_1=10$ m with a second firing at the depth $d_2=5$ m, and then a third firing (virtual) at the depth $d_1+d_2=15$ m, one obtains a spectrum according to curve 34 which is the sum of curves 31, 32 and 33. On this spectrum 34, it is observed that the content at the very low frequencies is greatly improved and that the notches are plotted. This spectrum is much better than the spectrum 35 obtained by summing in a conventional manner (without shift) signals emitted independently from the sources $10_1$ and $10_2$ (curve 35 is the sum of curves 31 and 32).

It is noteworthy that the virtual firing at the depth $d_1+d_2=15$ m has been carried out without having to physically implement a source at this greater depth.

Figure 8:
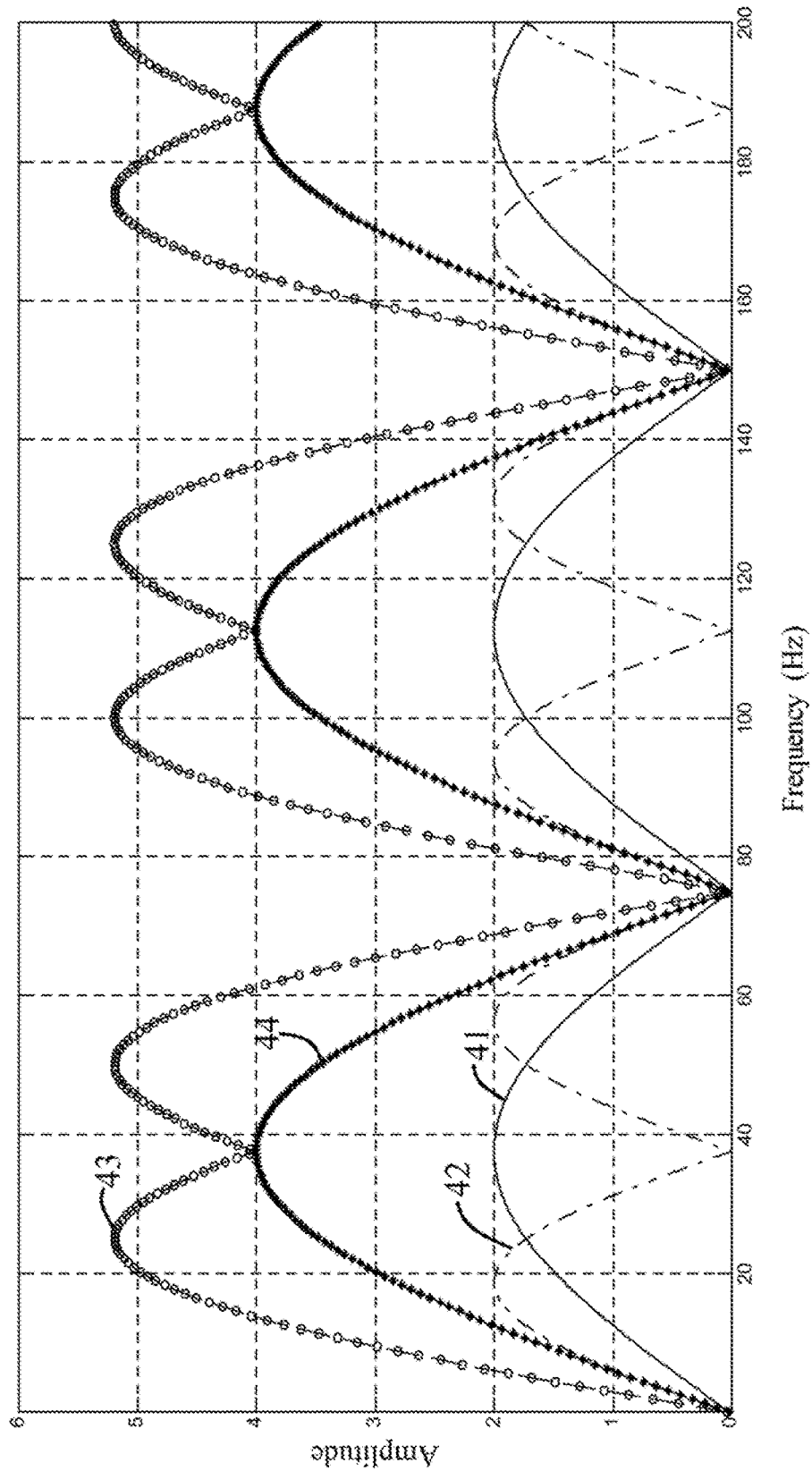
FIG. 8 is a graph showing spectra generated along a direction θ with the aid of a submerged seismic source triggered in a repetitive manner.

FIG. 8 is a graph analogous to that of FIG. 7 in the case of two sources with the same depth, that is to say $d_1=d_2=d$. Curve 41 is the same as curve 32 of FIG. 7, that is to say representing the spectrum emitted from the source 10 submerged at the depth $d=10$ m. Curve 42 represents the spectrum obtained by firing twice from this source 10, or from two collocalized sources. This is the same spectrum that would have been generated on the basis of a single virtual source of double depth. Curve 43 represents the spectrum that would be generated by aggregating the two firings from the source 10 (spectrum 41) and the firing from the virtual source (spectrum 42). Again, an appreciable improvement in the spectrum at the very low frequencies is observed by comparing with curve 44 which is the sum of the two firings at 10 m.

By "collocalized sources" is meant here two sources having the same emission position, or two slightly shifted positions at the same depth d, that is to say situated in the same Fresnel zone in relation to the frequency of the emitted seismic waves. At the low frequencies, this Fresnel zone has typical dimensions of several tens of meters.

On the basis of a seismic emission sequence which has been generated by superimposing several firings shifted in time in the manner indicated hereinabove, it is possible to gather a seismic signal at the level of one or more receivers. Various positionings of the receiver are possible.

Figure 9:
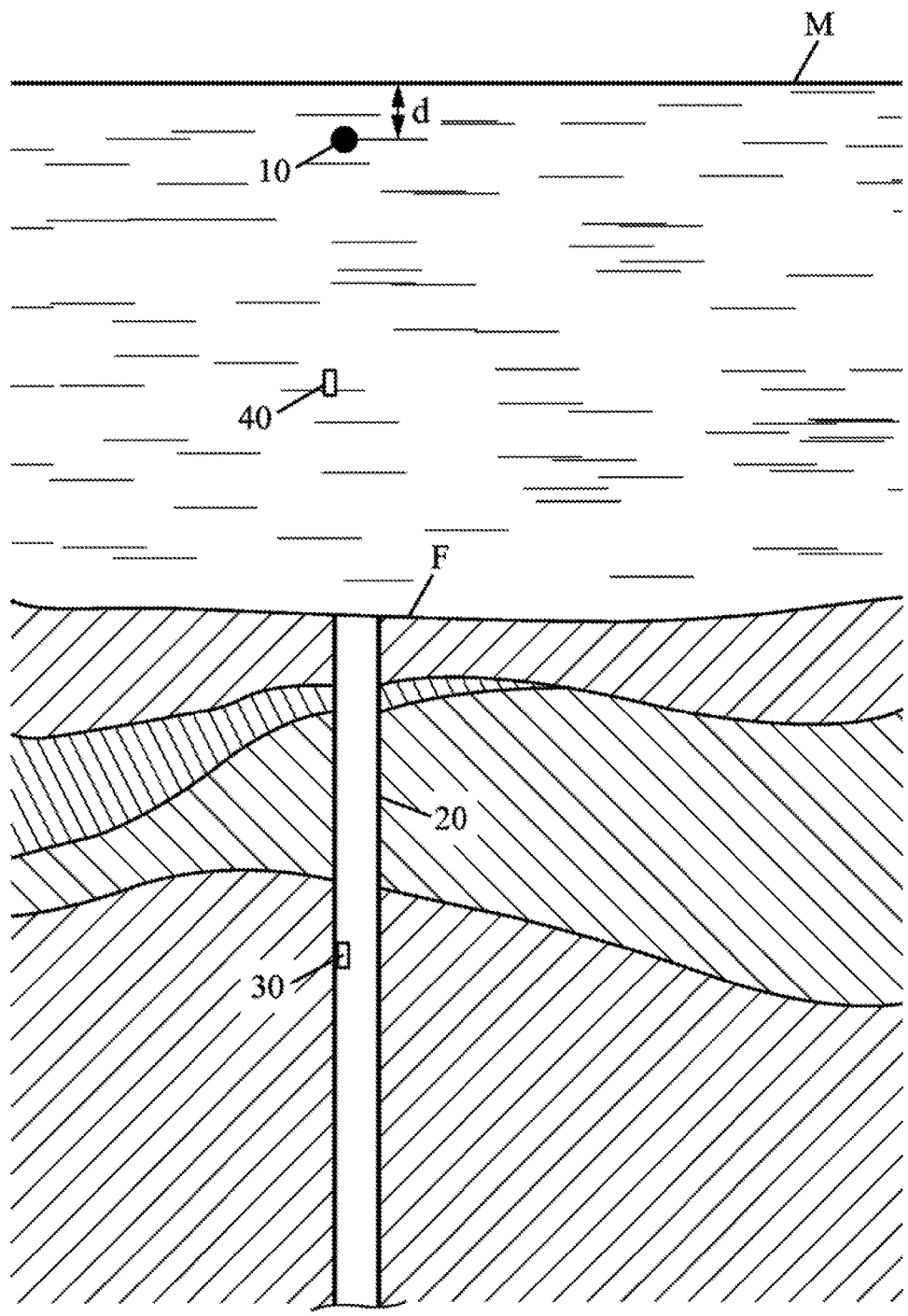
FIG. 9 is a diagram illustrating a possible configuration for an acquisition of seismic data using the present invention.

An acquisition geometry to which the method according to the invention is very suited is represented in FIG. 9. The receiver 30 is situated in a well 20 which has been drilled at the sea floor F, and the firings are executed from a source 10 placed substantially vertically in line with the well, that is to say with $\theta \approx 0$. The method is then used to record vertical seismic profiles (VSP) which, after a post-acquisition processing known per se, advise regarding the geological formations encountered by the seismic waves in the subsoil along the well between the sea floor F and the position of the receiver 30 and beyond.

Any type of underwater seismic source 10 can be employed, for example compressed-air gun, explosive, etc. The receiver 30 is for example a geophone secured against the wall of the well 20.

The method is also applicable at sea to techniques of surface seismic surveying, sources, on streamers (receivers composed of hydrophones) hauled by a boat or on geophones placed on the sea floor F to record seismic waves which have propagated and reflected on geological beds under the sea. The angle $\theta$ may then possibly deviate somewhat from the value $\theta=0$.

With reference to FIGS. 5 to 8, embodiments of the invention have been presented in which multiple firings judiciously positioned over time make it possible to reduce the incidence of the problem caused by the ghost in underwater acquisition. In other embodiments described hereinafter, the elimination of the ghost, or at least the reduction in its effects, results at least in part from the processing of the signal picked up by the receiver.

Before undertaking the conventional post-acquisition processing of a measured seismic signal sequence, a first step of the processing then consists in superimposing several terms comprising temporally shifted versions of the seismic signal measured by the receiver in the course of the sequence received.

Figure 1:
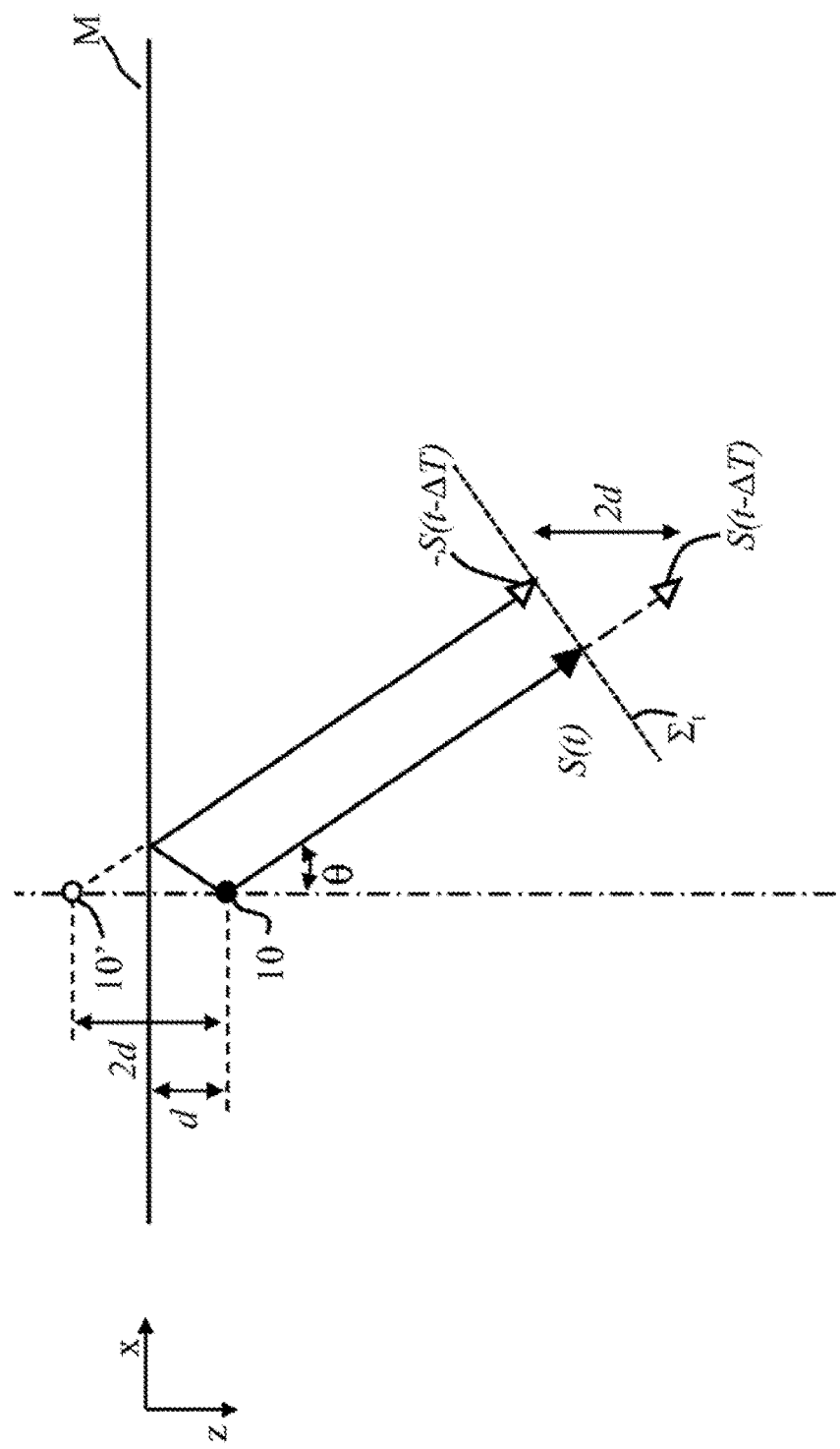
FIGS. 1 and 2, previously commented on, are diagrams illustrating a phase of acquiring seismic data in a maritime environment.

The emission sequence of seismic waves giving rise to the reception sequence thus processed is associated with a depth denoted D. This emission sequence can consist:
- of a single firing from a source 10 placed at a depth d, as in the configuration of FIGS. 1 and 2. We then have D=d;
- of a number k>1 of firings from k sources $10_1$, $10_2$, ..., $10_k$ placed at respective depths $d_1, d_2, ..., d_k$ and triggered with mutual delays equal to $(d_{i-1}+d_i) \cdot \cos \theta /V$. We then have $D=\Sigma_{i=1}^{k} d_i$ and, in the particular case where $d_1=d_2=...=d_k=d$, $D=k \cdot d$.

If R(t) denotes the seismic signal measured by the receiver an instant t in a given reception sequence, the summation of this signal R(t) with a copy R(t–ΔT) of this same signal delayed by $\Delta T=2D \cdot \cos \theta /V$ gives rise to a processed signal $R_2(t)$ with the expression:

$$R_2(t)=R(t)+R(t-\Delta T)=[S_1(t)+S_1(t-\Delta T)]*r(t)=S_2(t)*r(t) \qquad (6)$$

where $S_2(t)$ is given by equation (2) hereinabove, r(t) is the response of the probed environment which depends on the reflections undergone by the seismic waves between the geological beds, and * designates the linear convolution operation. In expression (6), no account has been taken of the noise which is added to the signal.

In expression (6), it is seen that the summation of the two temporally shifted versions of the received signal amounts to making it seem as if a firing had been performed at the depth D and then repeated with the delay ΔT, that is to say as if the seismic emission originated from a virtual source of depth 2D, with a ghost deferred in time as explained previously.

The summation (6) can be extended to an arbitrary number k (k>1) of copies of the received signal R(t) temporally shifted by multiples of ΔT, namely R(t), R(t–ΔT), R(t–2ΔT), ..., R(t–(k–1)ΔT):

$$R_k(t)=\Sigma_{i=0}^{k-1} R(t-i \cdot \Delta T)=[\Sigma_{i=0}^{k-1} S_1(t-i \cdot \Delta T)]*r(t)= S_k(t)*r(t) \qquad (7)$$

In the signal $R_k(t)$ thus processed, where $S_k(t)$ is given by equation (3) hereinabove, the ghost is deferred to the time k·ΔT instead of ΔT in the signal R(t) as received, and the spectral content at the low frequencies is improved.

Consequently, the reception of just the signal $R(t)=R_1(t)$ makes it possible, in the reception processing, to regenerate signals $R_k(t)$ for any integer k ranging from 2 to an arbitrarily chosen number n.

On the basis thereof, it is possible to undertake a new summation to make it seem as if seismic waves had been emitted from n sources of respective depths D, 2D, ..., n·D:

$$R'(t)=\Sigma_{k=1}^{n} R_k(t)=[\Sigma_{k=1}^{n} S_k(t)]*r(t)=S'(t)*r(t) \qquad (8)$$

Expression (8) can also be written in such a way that the summed terms comprise n times the seismic signal R(t) and, for each integer i lying between 1 and n–1, n–i times the seismic signal delayed by i·ΔT:

$$R'(t)=S'(t)*r(t)=\Sigma_{i=0}^{n-1}(n-i) \cdot R(t-i \cdot \Delta T) \qquad (9)$$

Expression (8) or (9) can further be written:

$$R'(t)=[\Sigma_{k=1}^{n}[S(t)-S(t-k \cdot \Delta T)]]*r(t)=n \cdot S(t)*r(t)-[\Sigma_{k=1}^{n} S(t-k \cdot \Delta T)]*r(t) \qquad (10)$$

where it is seen that the amplitude of the reflectivity associated with each ghost is n times less significant than that associated with the primary emission. The number n of firings taken into consideration can a priori be chosen as large as is desired. The hardware constraint of having to multiply the firings at closely spaced time intervals from the same emission position is therefore circumvented.

Figure 10:
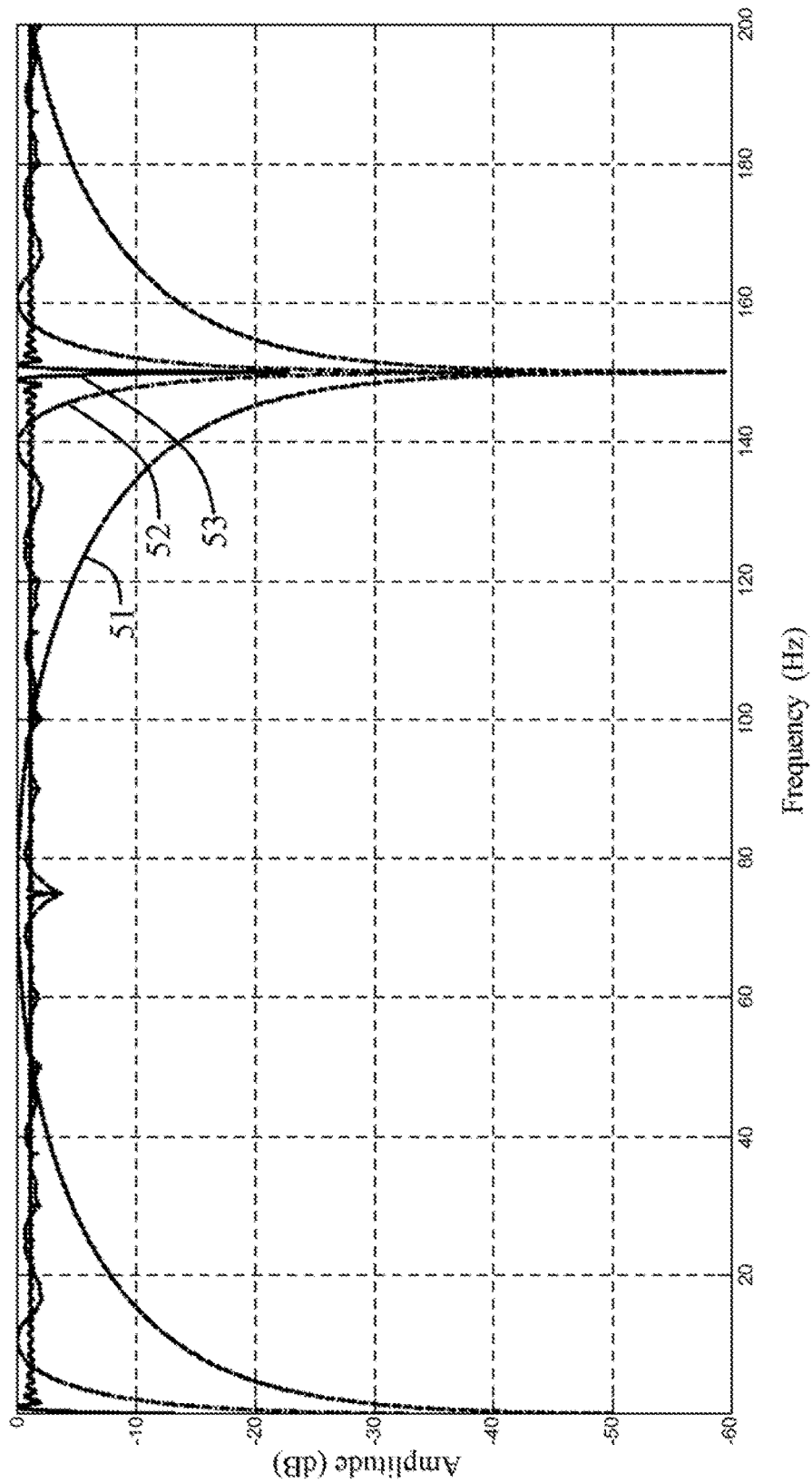
FIG. 10 is a graph showing spectra generated with the aid of a seismic source submerged at a depth of 5 m and triggered in a repetitive manner in accordance with various embodiments of the invention, without taking account of noise.

FIG. 10 shows, with amplitudes in decibels:
- the spectrum of the signal emitted on the basis of a single Dirac pulse from a source 10 of depth d=5 m (curve 51);
- the spectrum resulting from the summation (8) or (9) pertaining to n=10 sources comprising the source 10 generating the Dirac pulse at the depth D=d=5 m and n–1=9 virtual sources of respective depths 2d, 3d, ..., 10d (curve 52);
- the spectrum resulting from the summation pertaining this time to n=100 sources of respective depths d, 2d, ..., 100d (curve 53).

Figure 4:
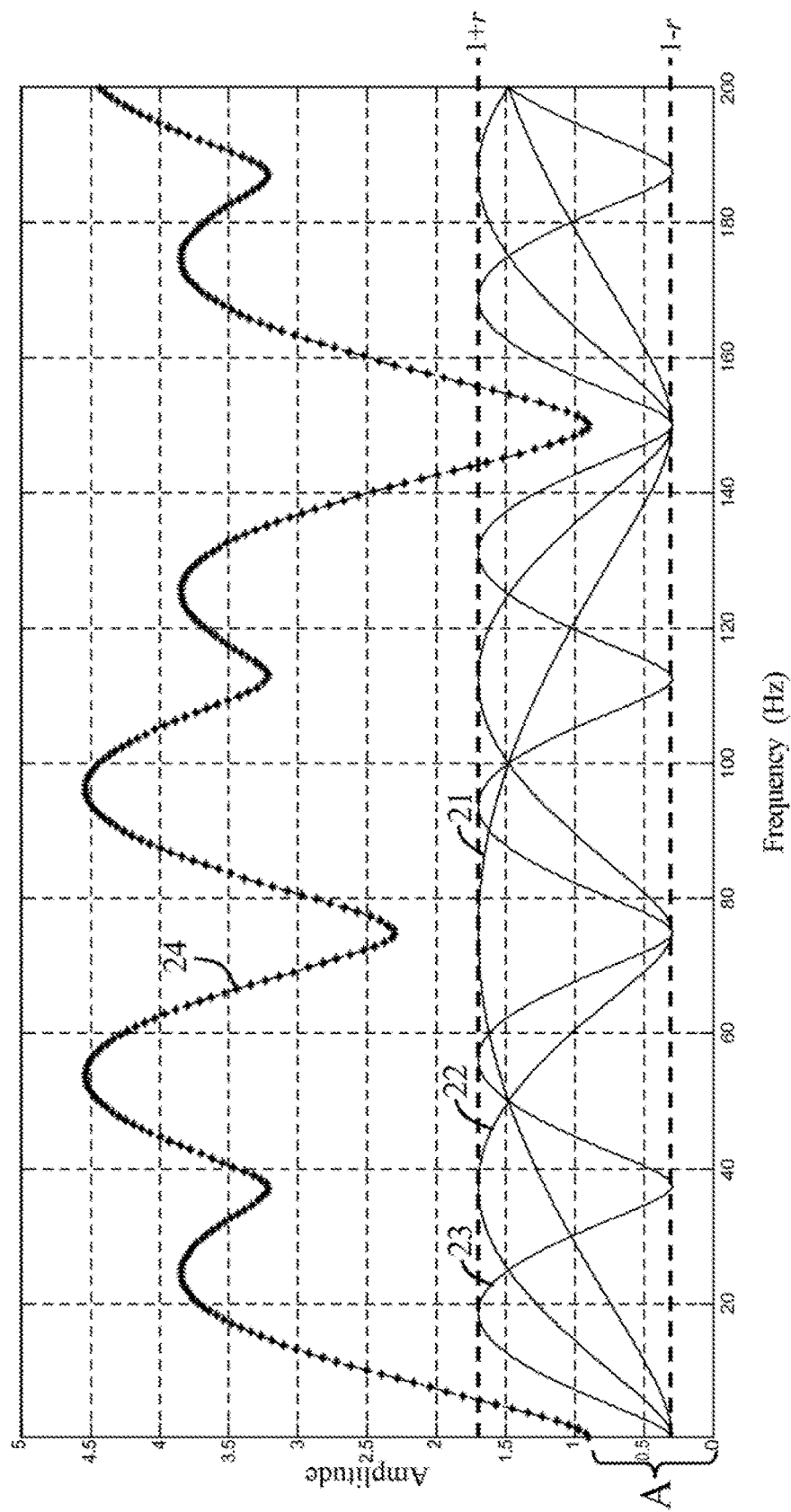
Figure 11:
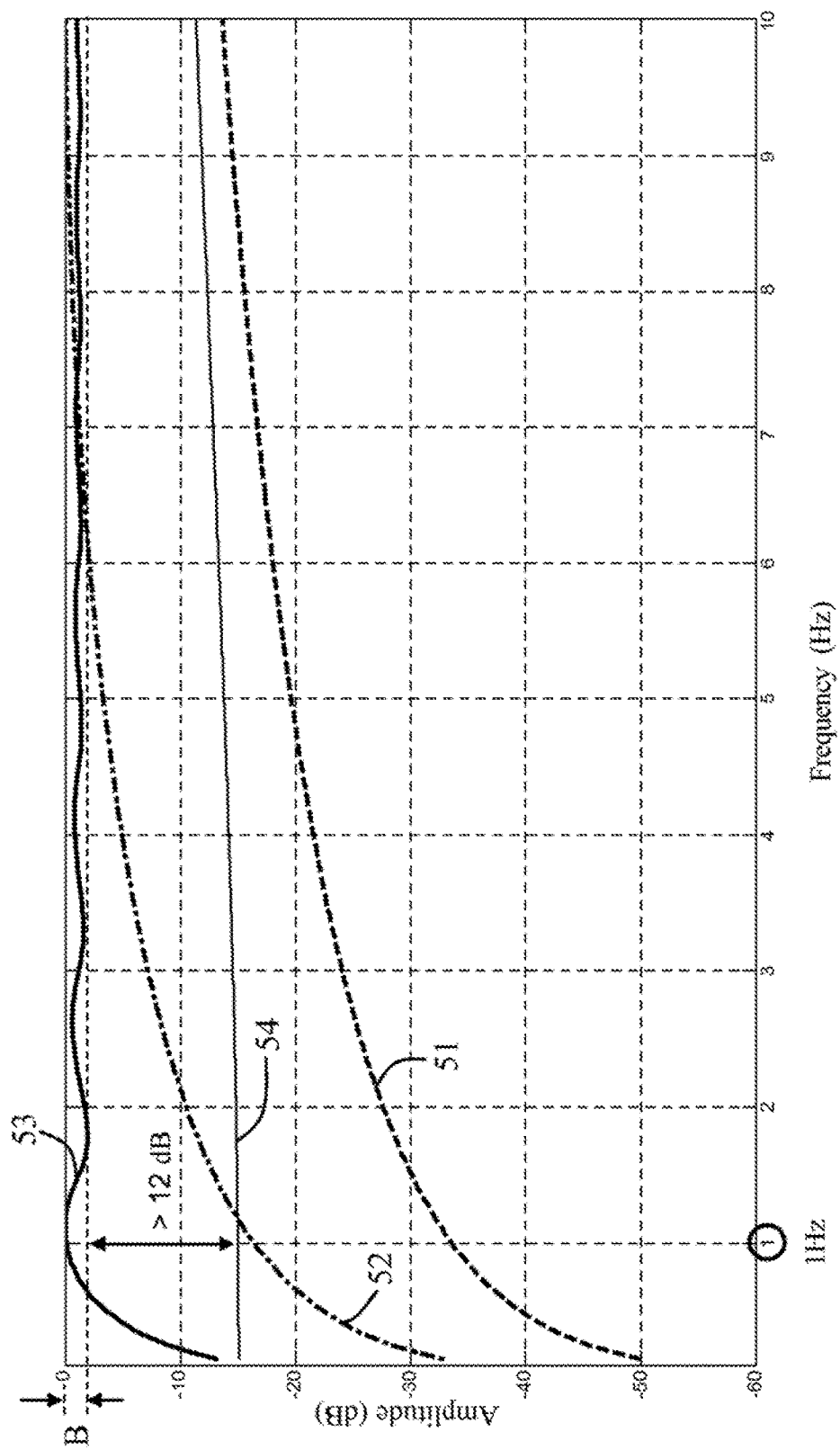
FIG. 11 is a graph showing a magnified part of FIG. 10.

FIG. 11 is a magnification of the part at the lowest frequencies of FIG. 10. Added thereto is the spectrum 54 obtained on the basis of a non-repeated firing at the depth d=5 m, but with a reflection coefficient of –0.7 at the water-air interface (equivalent of curve 22 of FIG. 4).

It is apparent that onward of about n=10 firings, the quality of the spectrum emitted becomes, at the low frequencies, as good as or better than by implementing a screen aimed at greatly decreasing the reflection coefficient. For n≈100, the spectrum is remarkably flat, with a residual ripple B of less than 2.5 dB and a gain of greater than 12 dB for a frequency of 1 Hz with respect to the spectrum 54.

It therefore appears desirable, generally, to choose in expression (8) or (9) a number n greater than 10, and preferably greater than 50.

As mentioned previously, no account is taken of the additive noise in expressions (6)-(10). FIGS. 12-16 make it possible to observe the impact of noise on the proposed scheme. These figures show, up to the first notch, spectra of real seismic emissions (when n=1) or virtual seismic emissions (when n>1), expressed in decibels for a source 10 of depth d=3 m.

Figure 12:
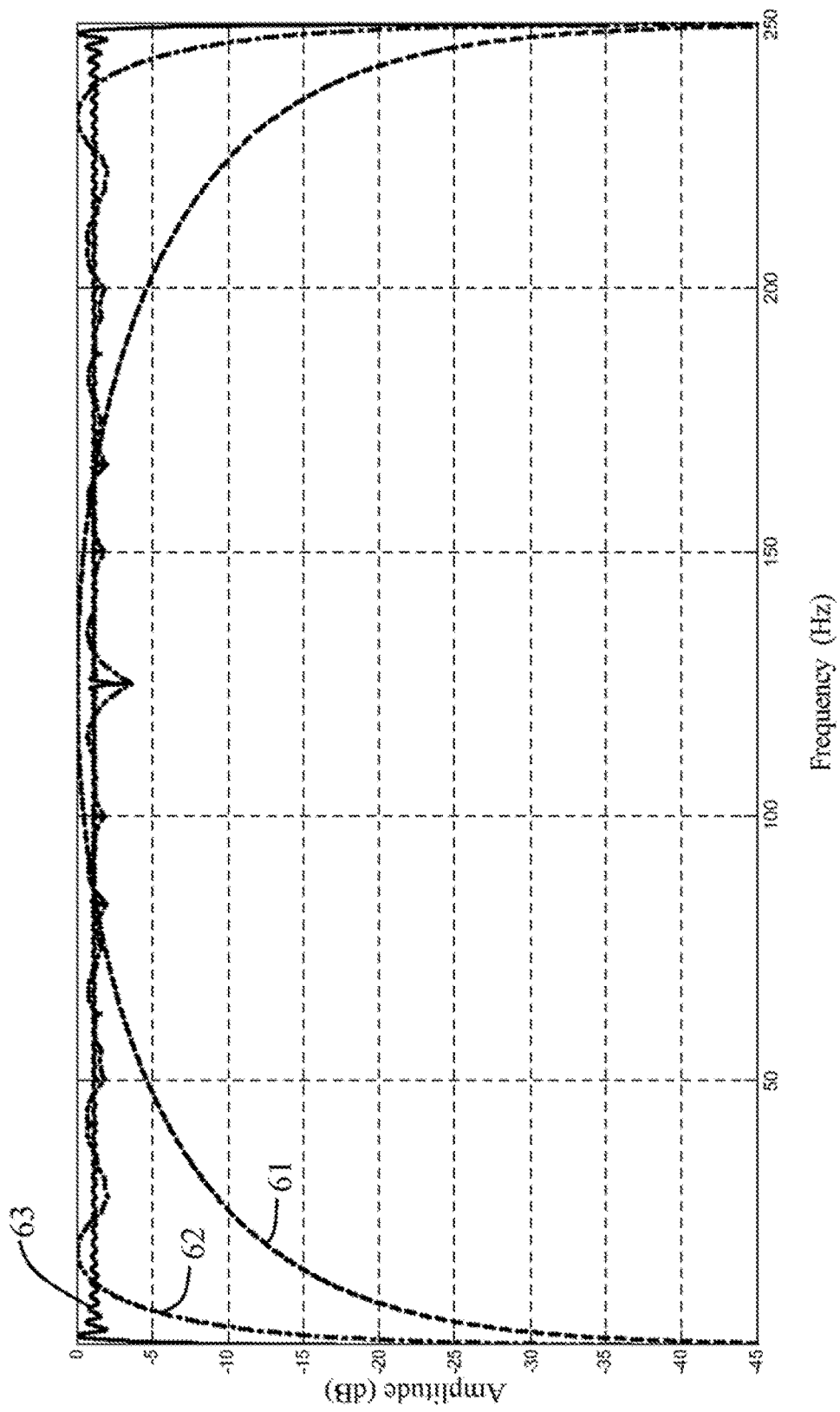
FIG. 12 is a graph showing spectra generated with the aid of a seismic source submerged at a depth of 3 m and triggered in a repetitive manner in accordance with various embodiments of the invention, without taking account of noise.

FIG. 12 is analogous to FIG. 10, except for the difference that the depth d is smaller (3 m rather than 5 m). No noise has been taken into account in the calculations. The spectrum 61 corresponds to a single firing without repetition. The spectrum 62 corresponds to a single firing with repetitions up to n=10. The spectrum 63 corresponds to a single firing with repetitions up to n=100.

Figure 13A:
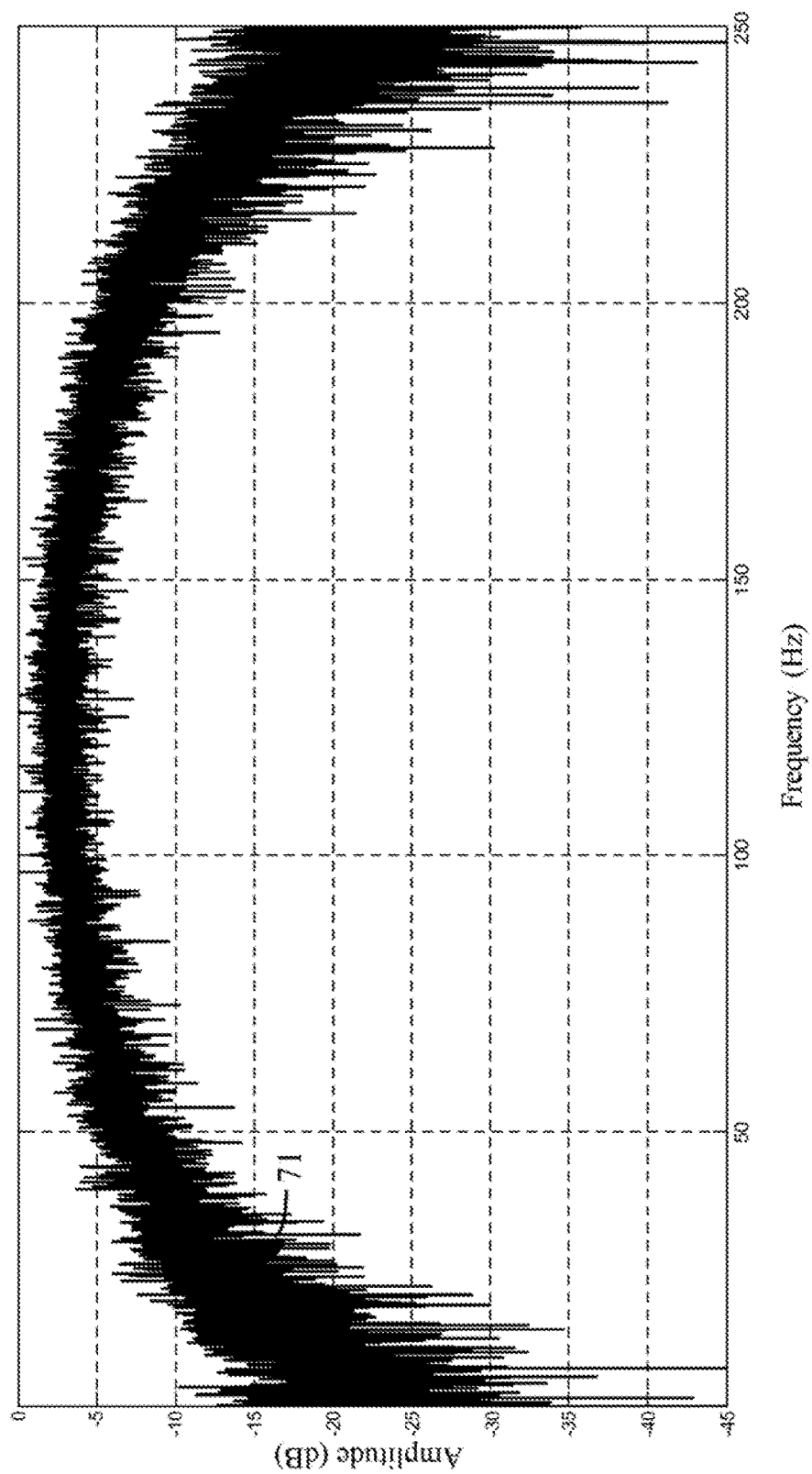
FIGS. 13A-C are graphs showing spectra analogous to those of FIG. 12, calculated while taking account of additive noise.
Figure 13B:
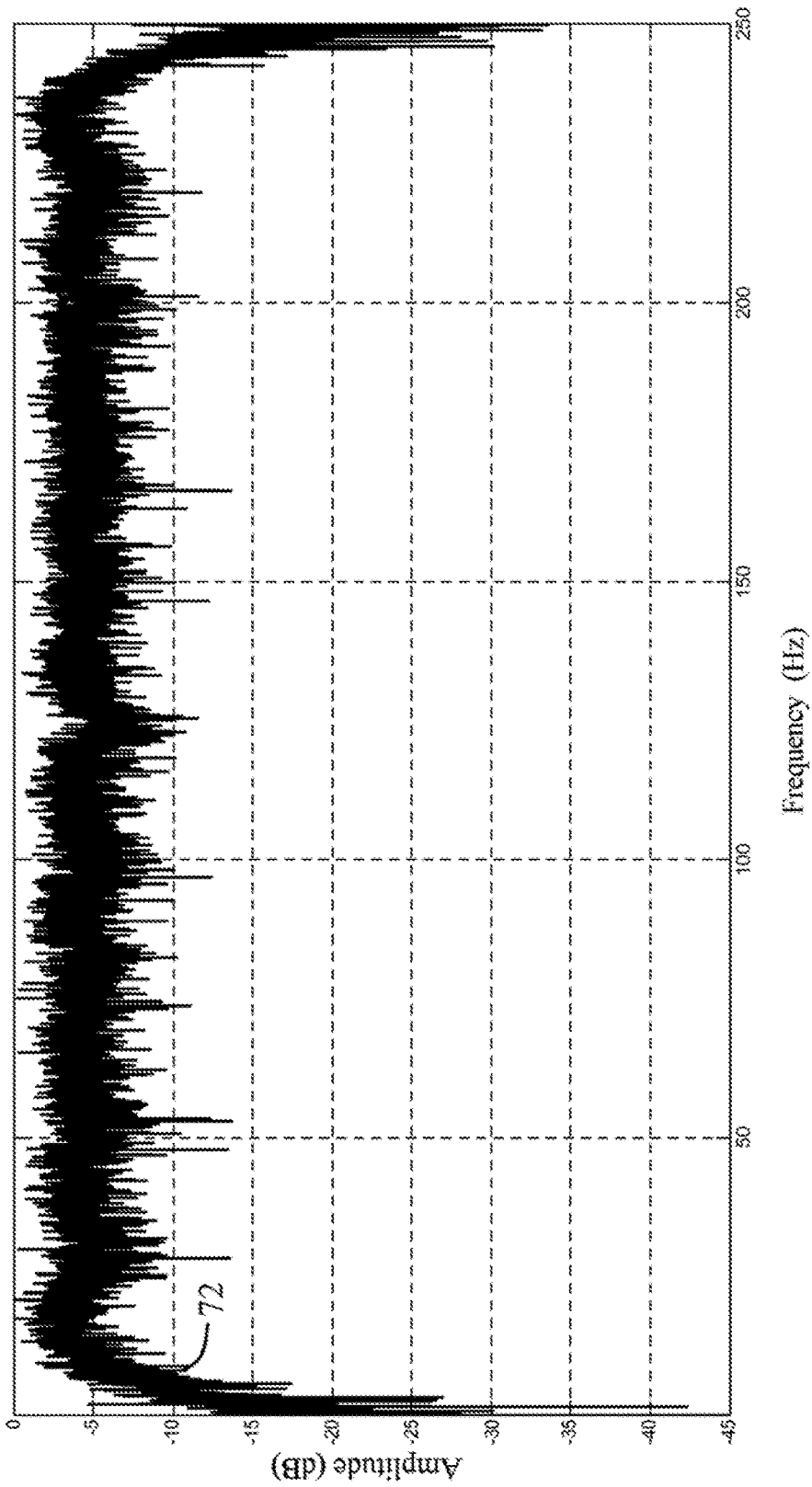
Figure 13C:
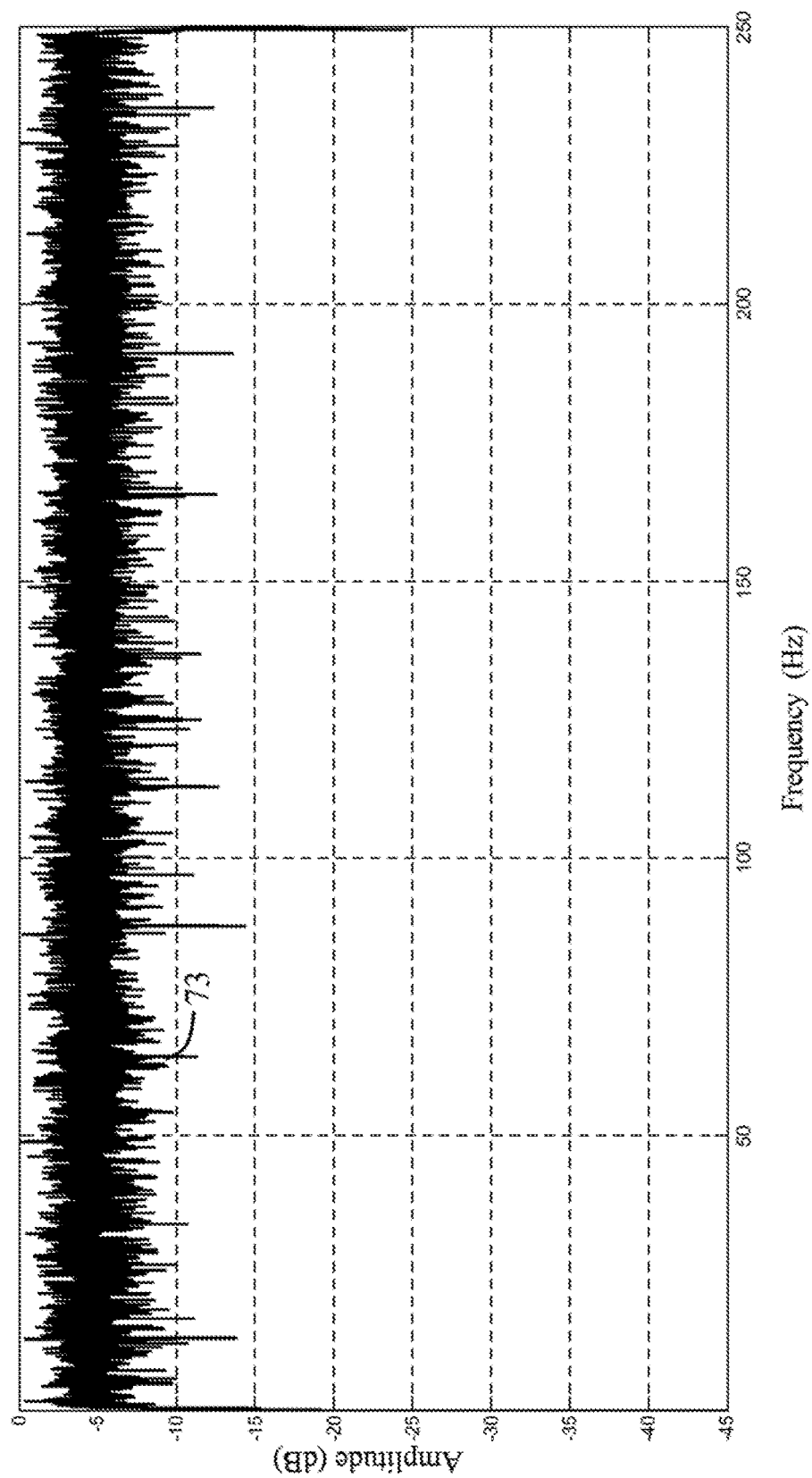

In FIG. 13A, the spectrum 71 corresponds to a single firing without repetition but with random noise. In FIGS. 13B and 13C, the spectra 72 and 73 correspond to a single firing with repetitions up to n=10 and up to n=100, respectively, and with noise with the same variance (25%).

Figure 14A:
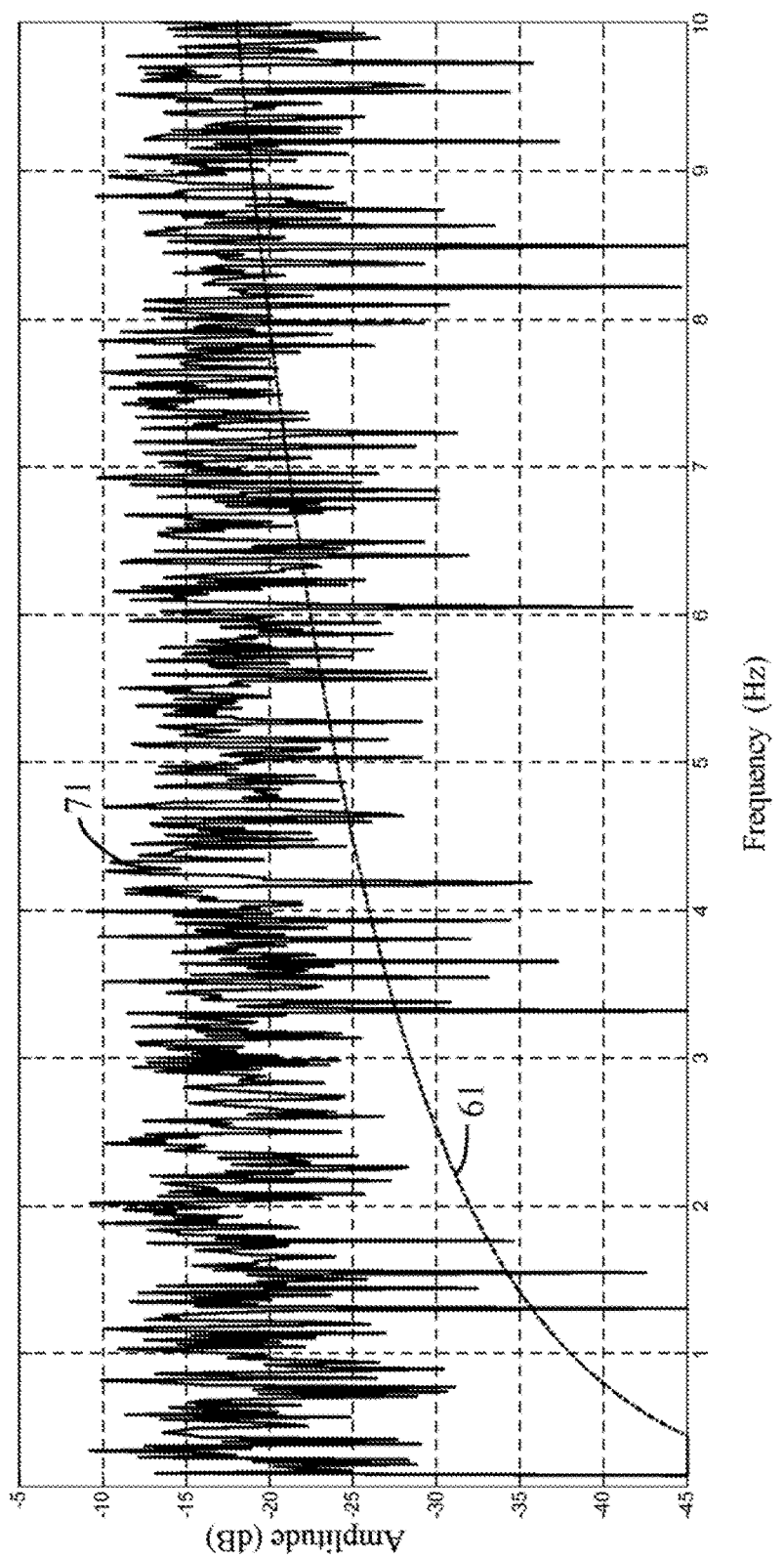
FIGS. 14A-C are graphs showing magnified parts of FIGS. 13A-C, respectively.
Figure 14B:
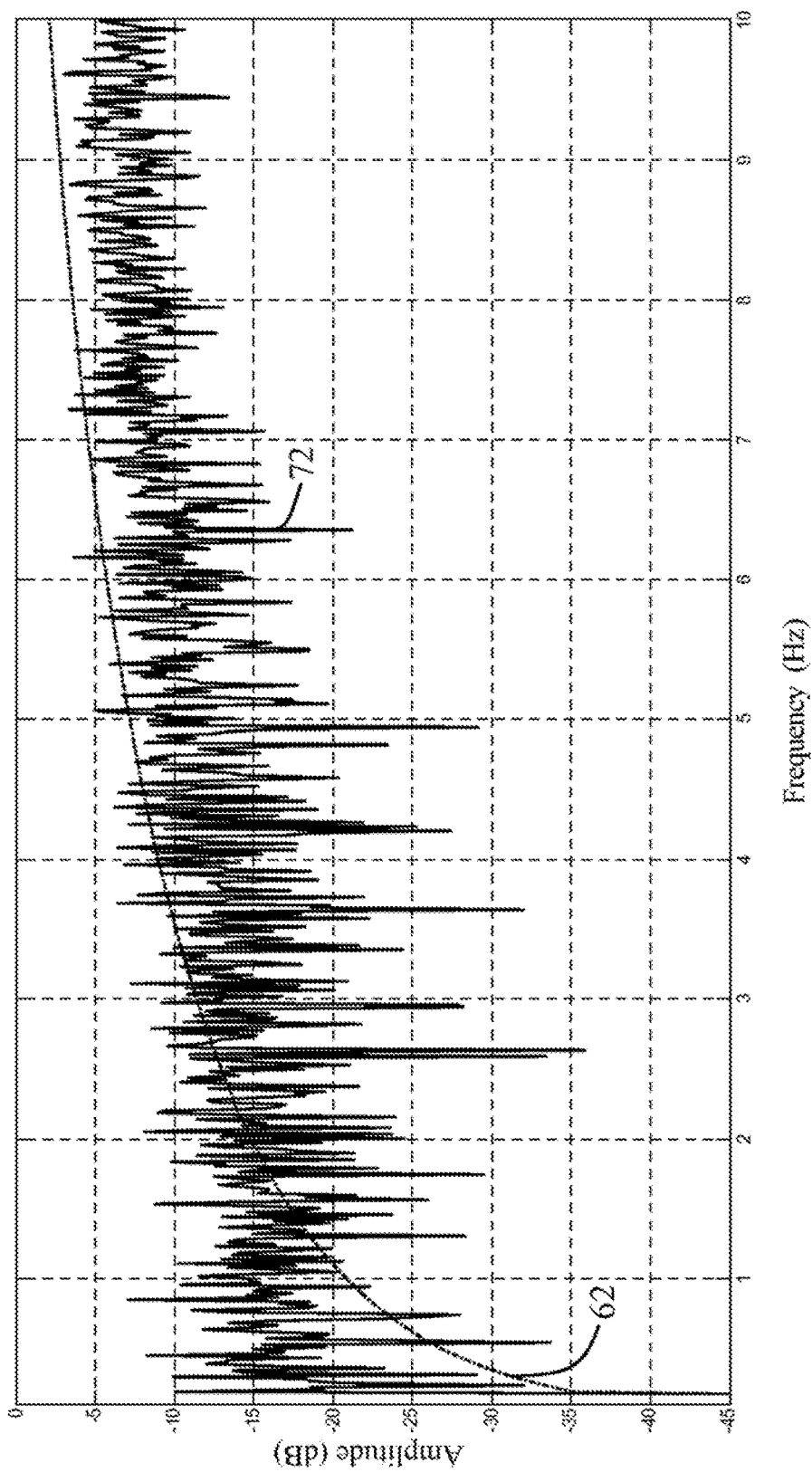
Figure 14C:
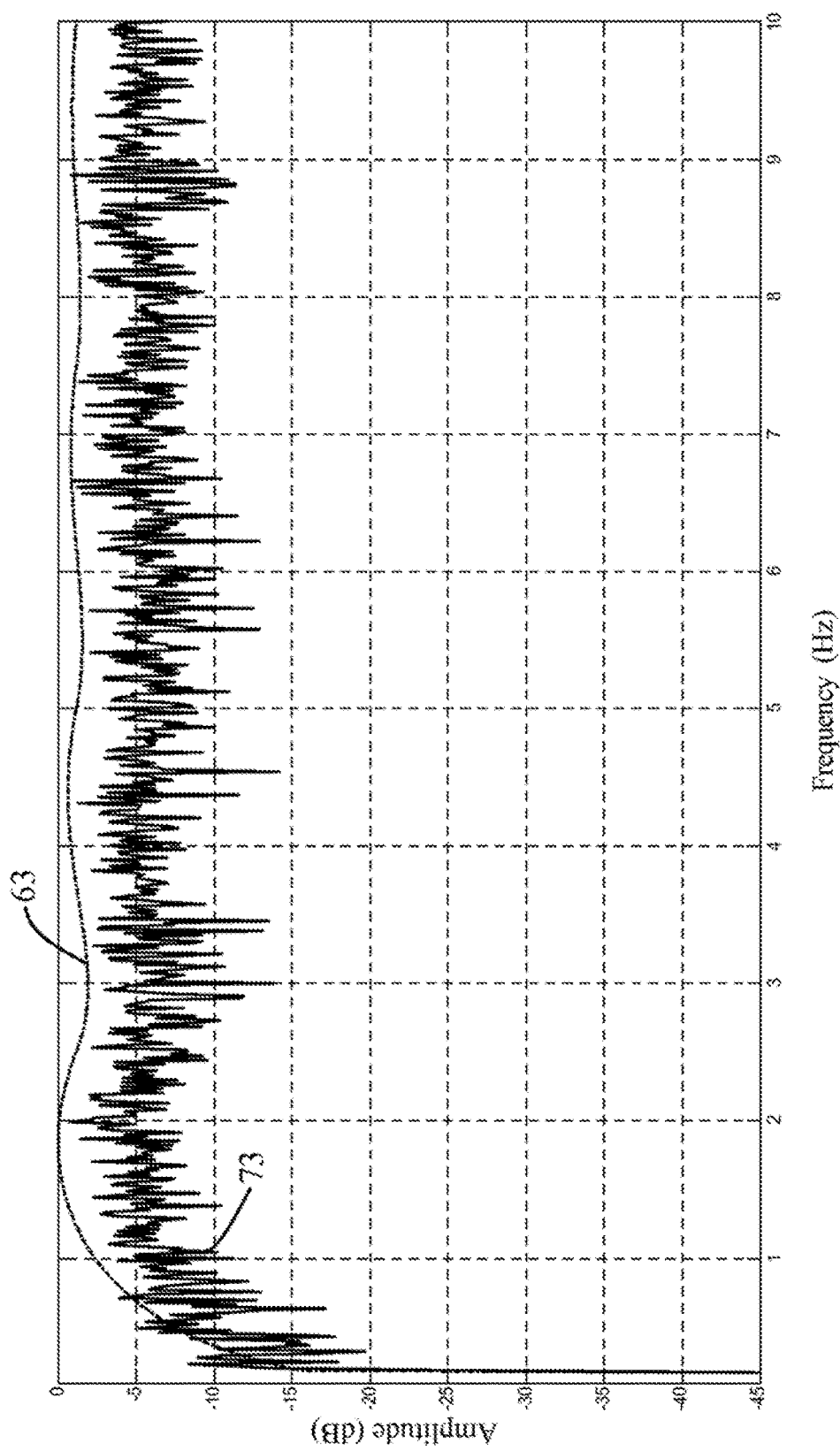

The noise noticeably degrades the quality of the spectrum. Its influence on the lowest frequencies is visible in FIGS. 14A-C. In FIG. 14A (no repetition), curves 61 and 71 correspond to those represented respectively in FIGS. 12 and 13A at the low frequencies, that is to say less than 10 Hz. In FIG. 14B (repetition with n=10), curves 62 and 72 correspond to those represented respectively in FIGS. 12 and 13B at the low frequencies. And in FIG. 14C (repetition with n=100), curves 63 and 73 correspond to those represented respectively in FIGS. 12 and 13C at the low frequencies.

It is seen that though the repetition process flattens the spectra and reduces the width of the notches, it does not have any appreciable effect on the amplitude of the noise when a single firing is physically carried out.

It is however possible to reduce the impact of the noise by resorting to several emission sequences which follow one another in an independent manner. Here p denotes the number of successive and independent emission sequences (p>1), and $D_1, D_2, \ldots D_p$ denote the depths respectively associated with these p emission sequences. To each emission sequence produced by the seismic source or sources 10 there corresponds a respective reception sequence at the level of the geophone 30.

For example, p independent successive firings can be undertaken from the source 10 submerged at the depth d and for each firing (a firing forming in this case an emission sequence) the n repetitions can be generated at the stage of the processing applied to the reception sequences.

The successive firings, temporally spaced so as not to interfere with one another, give rise to the recording of respective reception sequences R(t) that are each summed by the process (8) or (9) described hereinabove, given a certain number n. The sums thus obtained for various sequences are thereafter combined to exploit successive observations affected by independent noise. The combination can again consist of a summation.

The compressed-air source can be reloaded between two successive firings. The number p of these firings typically lies between 5 and 20. For example, it may be from 8 to 10. This number p remains moderate, and makes it possible to carry out the series of measurements in a fairly brief time, the availability of the well 20 being limited in practice because of the operational drilling or production constraints.

Figure 15A:
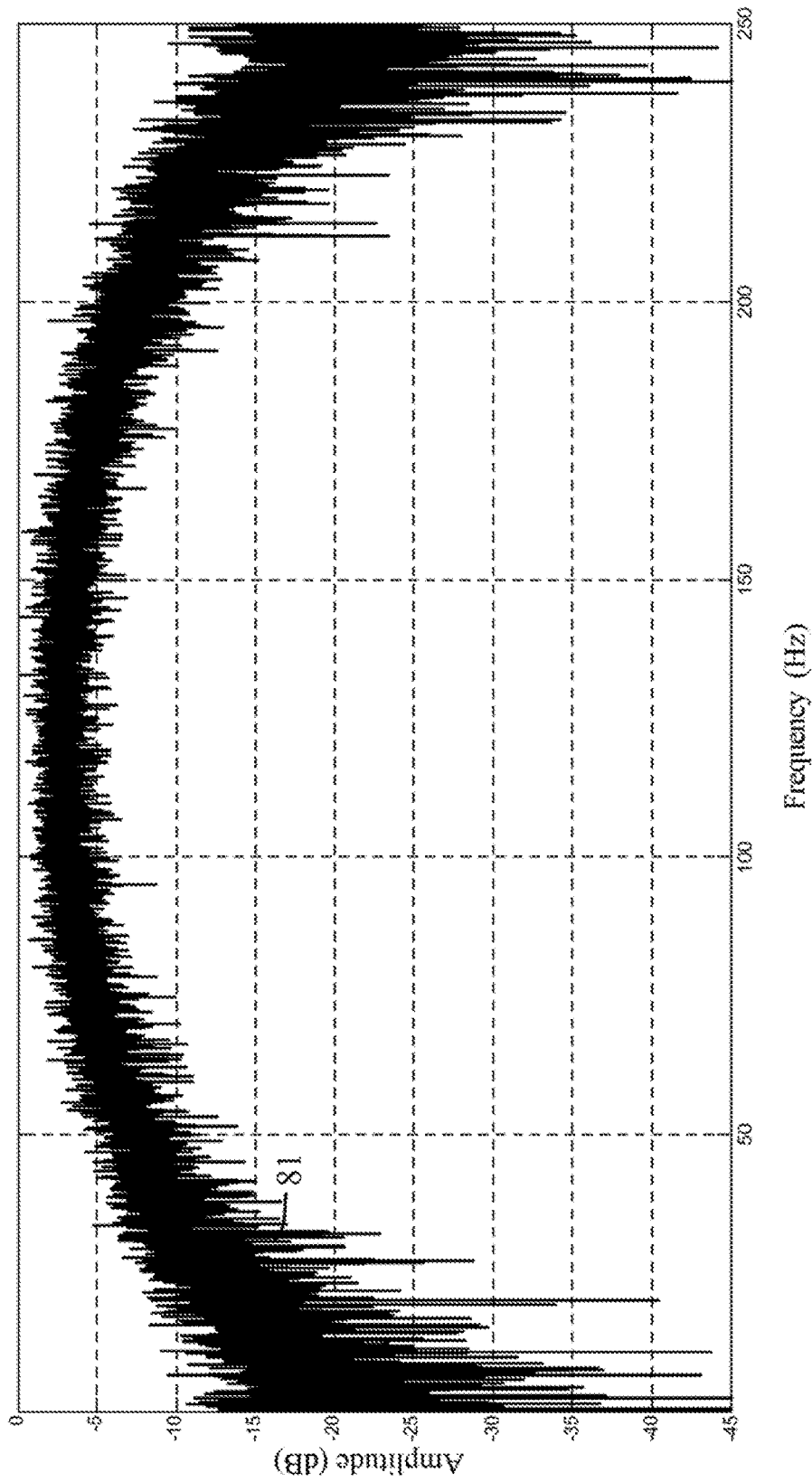
FIGS. 15A-C are graphs showing noisy spectra analogous to those of FIGS. 13A-C, calculated while taking into account various realizations of the additive noise.
Figure 15B:
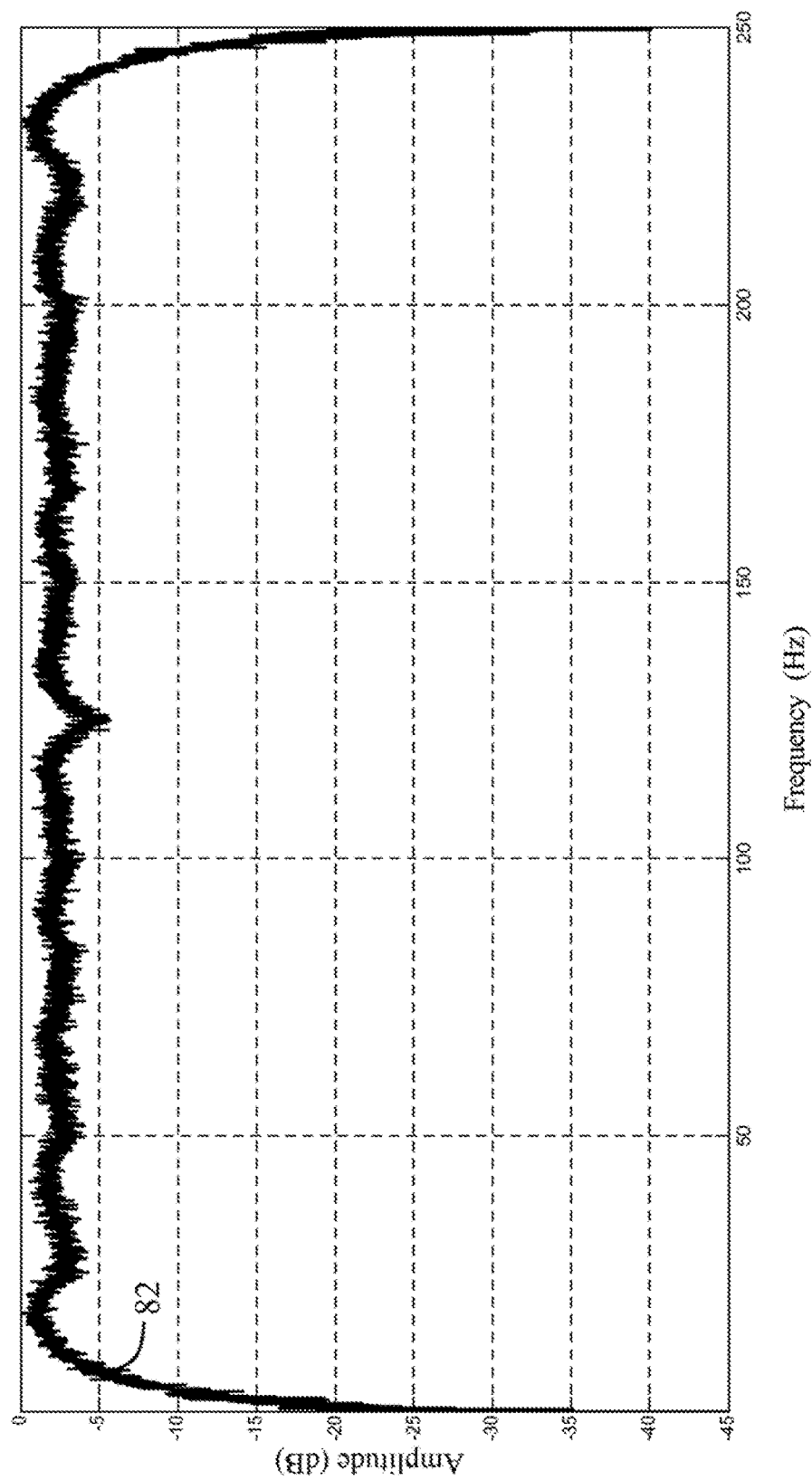
Figure 15C:
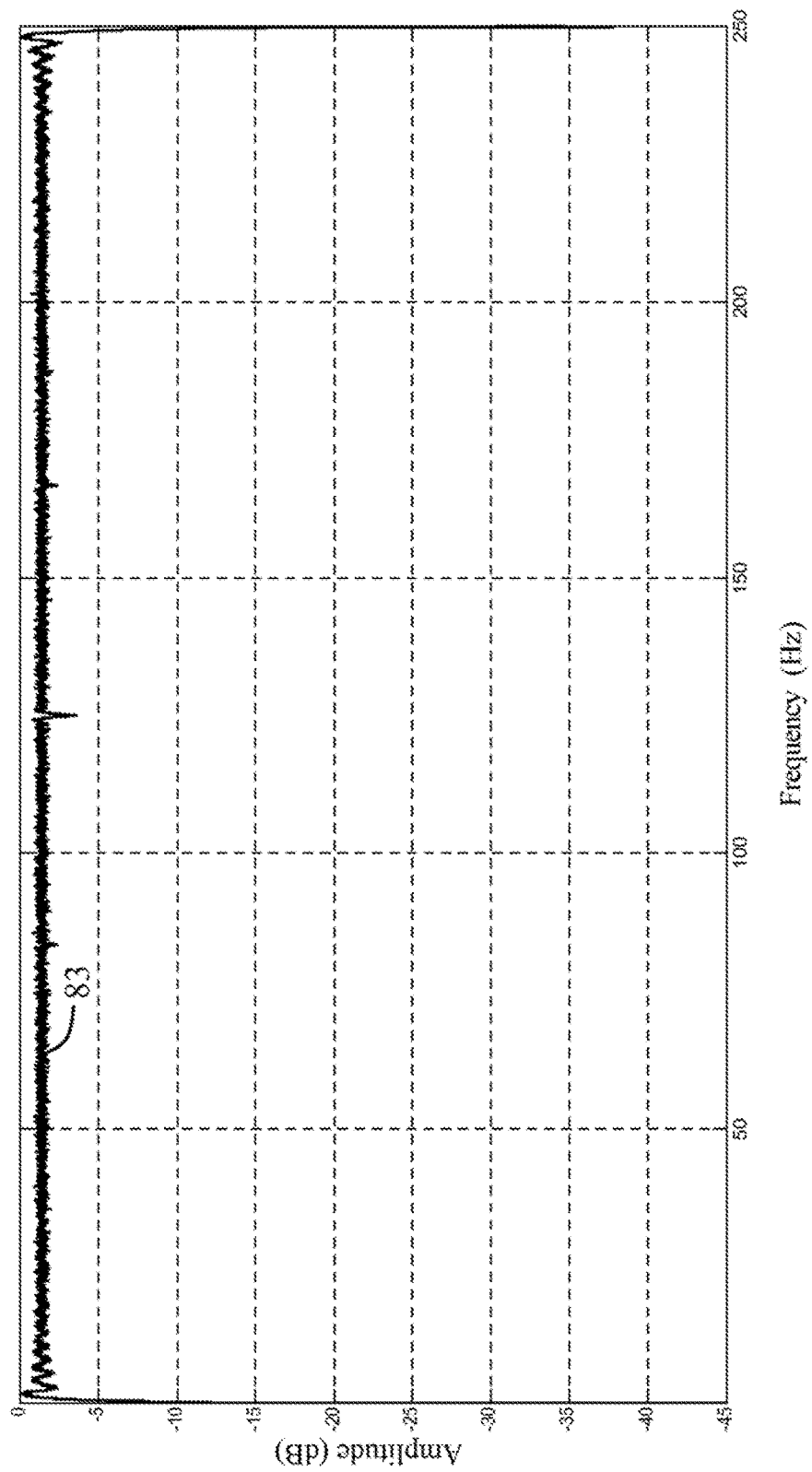

In FIG. 15A, the spectrum 81, similar to the spectrum 71 of FIG. 13A, corresponds to a single firing without repetition (n=1), with noise. In FIGS. 15B and 15C, the noisy spectra 82 and 83 correspond to a single firing with repetitions up to n=10 and up to n=100, respectively, each repetition being generated by calculation by adding a different realization of the noise of the same variance. Stated otherwise, a signal $S_k(t)$ has firstly been calculated according to (5) on the basis of a Dirac pulse $S(t)=\delta(t)$ for k=1, 2, ..., n, and then a noisy signal $S_k(t)+N_k(t)$ has been calculated by adding a noise term $N_k(t)$ drawn randomly for each integer k. The summation then gives rise to a seismic signal S'(t):

$$S'(t)=\Sigma_{k=1}^{n}[S_k(t)+N_k(t)] \quad (11)$$

which, after convolution with the response r(t) of the environment, provides a noisy version of equation (8) whose Fourier transform is shown in FIGS. 15A-C.

FIGS. 15A-C evince not only a flattening of the spectrum but also an appreciable increase in the signal-to-noise ratio when the number of repetitions increases when resorting to different realizations of the noise. In practice, the different realizations of the noise are obtained using p>1 real firings.

Figure 16A:
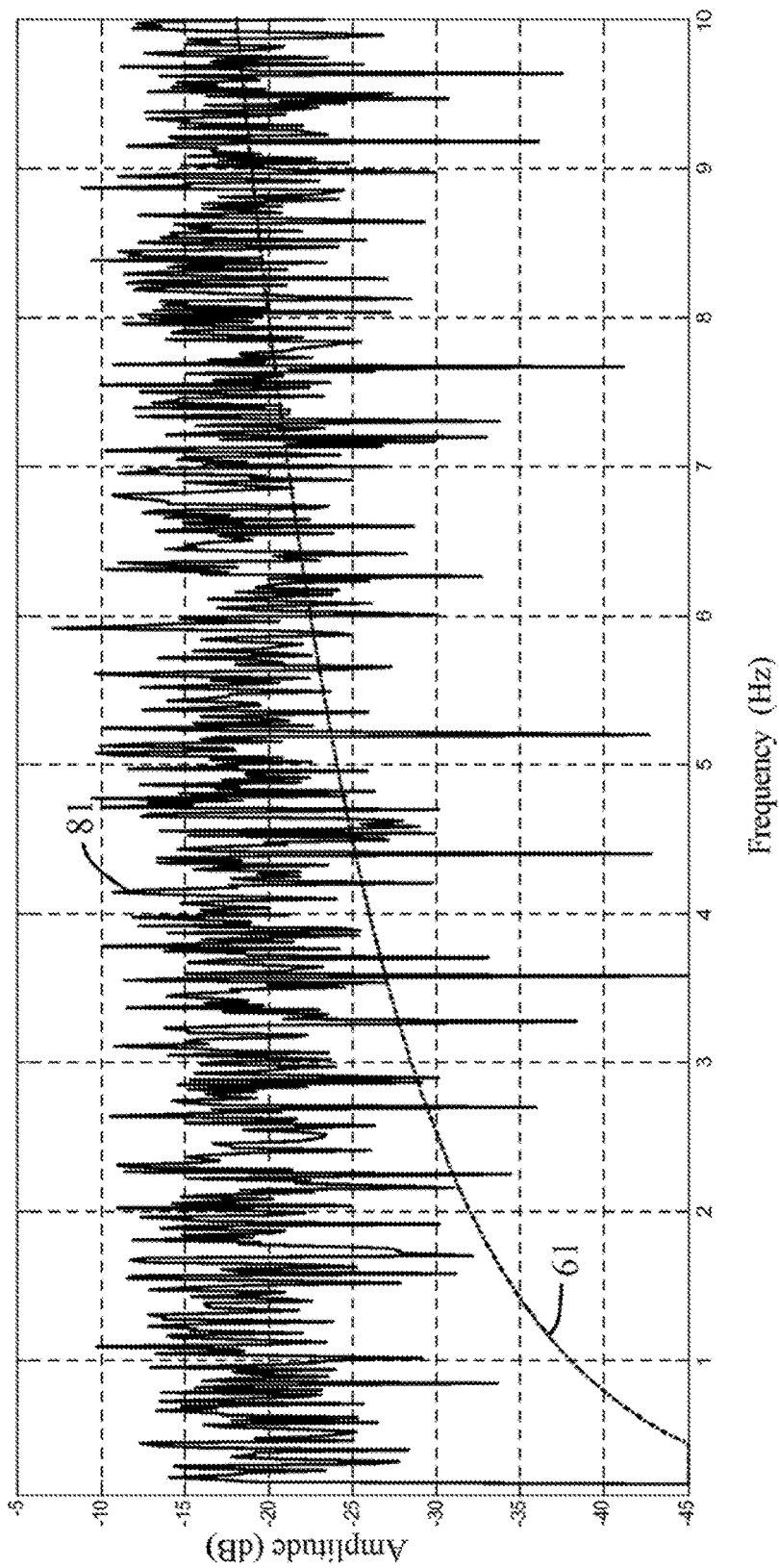
FIGS. 16A-C are graphs showing magnified parts of FIGS. 15A-C, respectively.
Figure 16B:
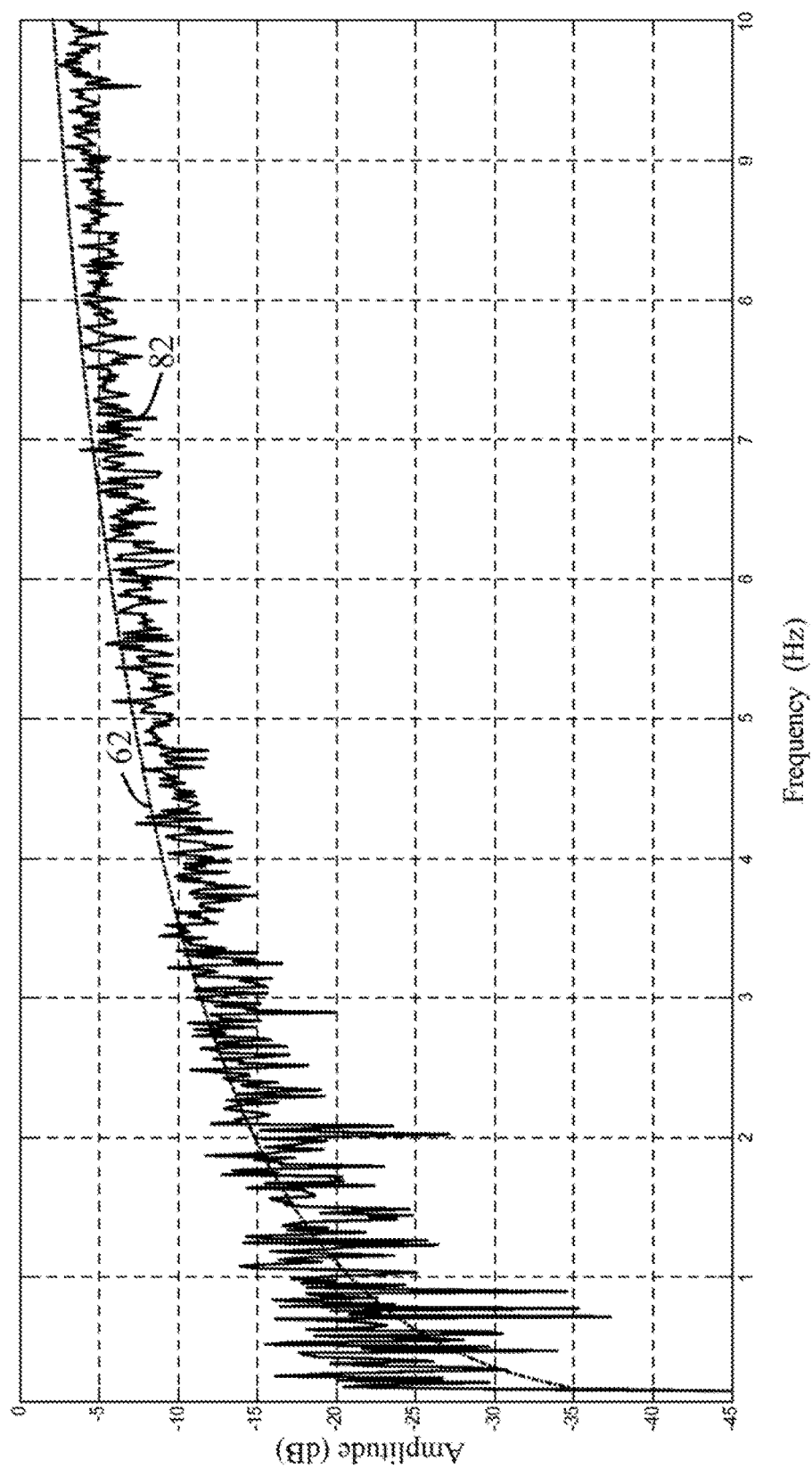
Figure 16C:
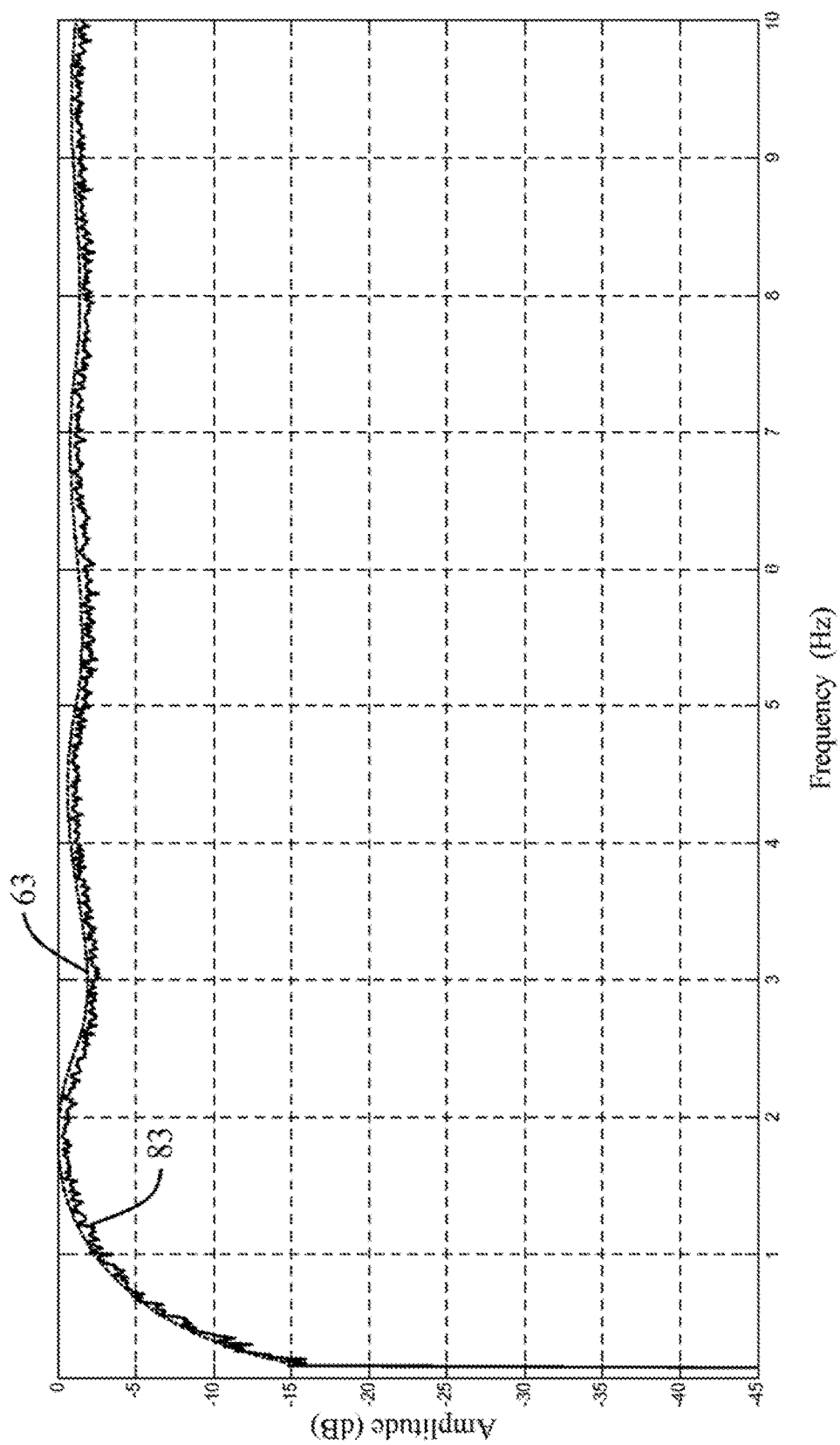

This increase in the signal-to-noise ratio with the number of repetitions is still sharper at the low frequencies. This may be seen in FIGS. 16A-C. In FIG. 16A (no repetition), curves 61 and 81 correspond to those represented respectively in FIGS. 12 and 15A at the low frequencies, less than 10 Hz. Of course, a signal-to-noise ratio comparable to that of FIG. 14A is found in FIG. 16A. In FIG. 16B (repetition with n=10), curves 62 and 82 correspond to those represented respectively in FIGS. 12 and 15B at the low frequencies. And in FIG. 16C (repetition with n=100), curves 63 and 83 correspond to those represented respectively in FIGS. 12 and 15C at the low frequencies.

It is therefore beneficial to use multiple firings on site and not to make do with a single firing that would be repeated when processing.

However, there is nothing to prevent the carrying out of a certain number of firings during acquisition, making it possible to obtain a sufficient signal-to-noise ratio, and to continue the artificial repetition of these p firings during processing.

Thus, in an embodiment of the method according to the invention where the number of firings p is chosen according to circumstances, the seismic waves emitted from the source 10 are furthermore measured by a hydrophone 40 submerged under the seismic source in a position aligned along the direction of angle θ. FIG. 9 shows such a hydrophone 40 in a VSP acquisition configuration (θ=0).

During acquisition, the seismic waves measured by the hydrophone 40 form a control signal W(t) which receives the same summation processing as that which will be applied to the seismic signal R(t) recorded by the geophone 30, for example according to (8) or (9) with a fairly large number n (for example n=100). This processing applied to the control signal W(t) also comprises the combining on the p firings which have already been performed. As the acquisition proceeds, it is then possible to examine whether the control signal W(t) thus processed after p firings does or does not satisfy a convergence criterion.

If the convergence criterion is satisfied, the (real) firings are stopped and the well can be released to continue drilling or for production. If it is not satisfied, acquisition continues with an additional firing, and so on and so forth. The total number of firings can be limited to a maximum value, for example to p=10 or to p=20.

Several convergence criteria are usable.

The convergence criterion may in particular pertain to the spectral shape of the signal resulting from the processing applied to the control signal W(t). Accordingly, the spectrum of the combined signal is calculated by Fourier transform and the amplitude of its ripples is measured in a span of low frequencies (for example from 0.5 to 20 Hz). If these ripples remain less than a threshold of a few decibels, it is decided that the convergence criterion is satisfied and the firings are stopped; otherwise they are continued.

The criterion can further pertain to the signal-to-noise ratio of the signal resulting from the processing applied to the control signal W(t). This ratio is calculated and if it is shy of a threshold, for example a few decibels, it is decided that the convergence criterion is satisfied and the firings are stopped; otherwise they are continued.

The convergence criterion used can also combine a criterion on the spectral shape and another on the signal-to-noise ratio.

This type of embodiment with a control hydrophone 40 makes it possible to ensure sufficient quality of the seismic waves utilized while avoiding shutting down the well 20 for too long.

Some at least of the p emission sequences used to reduce the impact of noise can comprise several coordinated firings so as to produce the emission which would result from a firing from a virtual source (see equation (5)). For one or more integers q lying between 1 and p, a depth $D_q=\Sigma_{i=1}^{k}d_i$ is then associated with the qth sequence with sources triggered successively at depths $d_1, d_2, \ldots, d_k$ and with the appropriate delays between these triggerings.

If n real sources are employed at depths $d_1, d_2, \ldots, d_n$ to acquire VSPs, one possibility is to use up to:

$C_n^1$=n emission sequences consisting of the independent single firings from these n sources at the depths $d_1, d_2, \ldots, d_n$, $C_n^2$=n(n−1)/2 independent emission sequences each consisting of 2 coordinated firings from 2 of the n sources;

...

$C_n^i$=n!/[i!(n−i)!] independent emission sequences each consisting of i coordinated firings from i of the n sources (1≤i≤n);

...

and $C_n^n$=1 independent emission sequence consisting of n coordinated firings from the n sources.

It is thus possible to generate up to $N=\Sigma_{i=1}^n C_n^i 2^n - 1$ independent emission sequences from varied depths with the aid of n sources only. The independent realizations of noise by which these emission sequences are affected make it possible to increase the signal-to-noise ratio. Through the repetition process implemented during the processing of the signal, it is possible to flatten their spectrum between the notches. Finally, a judicious choice of the depths of the n sources makes it possible to obtain a diversity not only in the noise included in the emission sequences, but also in the depths of the real and virtual firings, thereby again helping to obtain a flat spectrum and to better circumvent the notches.

A seismic signal processing device usable to implement one or the other of the above embodiments of the method according to the invention comprises one or more processors configured to sum the terms arising from the signal R(t) measured in one or more reception sequences by one or more seismic receivers in the manner described hereinabove.

The processing can be implemented with the aid of one or more computers. Each computer can comprise a calculation unit of processor type, a memory for storing data, a permanent storage system such as one or more hard disks, communication ports for managing communications with external devices, in particular for the loading of the signals R(t) recorded by one or more geophones 30, and user interfaces such as for example a screen, a keyboard, a mouse, etc.

Typically, the calculations and the steps of the hereinabove described method are executed by the processor or processors using software modules which can be stored, in the form of program instructions or code readable by the computer and executable by the processor, on a recording medium readable by computer such as a read only memory (ROM), a random access memory (RAM), CD-ROMs, magnetic tapes, diskettes and optical devices for storing data.

The embodiments described hereinabove are illustrations of the present invention. Diverse modifications may be made to them without departing from the scope of the invention which emerges from the appended claims.

The invention claimed is:

1. A method for acquiring seismic data relating to a subsoil zone situated under the sea, the method comprising:
   emitting seismic waves along a direction of emission forming an angle θ with the vertical, the emitted seismic waves comprising at least one emission sequence generated with the aid of at least one submerged seismic source, each emission sequence having an associated depth;
   gathering a seismic signal subsequent to emission of the seismic waves and to propagation of the seismic waves in the subsoil, the gathered seismic signal comprising a reception sequence corresponding respectively to each emission sequence; and
   processing the seismic signal,
      wherein processing the seismic signal comprises, for each reception sequence corresponding to an emission sequence, summing a plurality of terms including the seismic signal of said reception sequence and the seismic signal of said reception sequence delayed by ΔT=2D·cos θ/V, where V is a speed of propagation of the seismic waves in water and D is the depth associated with said emission sequence.

2. The method for acquiring seismic data as claimed in claim 1, wherein the summed terms for a reception sequence comprise the seismic signal of said reception sequence and k−1 copies of the seismic signal of said reception sequence having delays respectively equal to i·ΔT for i=1, 2, . . . , k−1, where k is an integer greater than 1.

3. The method for acquiring seismic data as claimed in claim 1, wherein the summed terms for a reception sequence comprise n times the seismic signal of said reception sequence and, for each integer i lying between 1 and n−1, n−i times the seismic signal of said reception sequence delayed by i·ΔT, where n is an integer greater than 1.

4. The method for acquiring seismic data as claimed in claim 3, wherein the number n is greater than 10.

5. The method for acquiring seismic data as claimed in claim 3, wherein the number n is greater than 50.

6. The method for acquiring seismic data as claimed in claim 1, wherein an emission sequence of the seismic waves comprises a single firing performed with the seismic source submerged at the depth D associated with said emission sequence.

7. The method for acquiring seismic data as claimed in claim 1, wherein an emission sequence of seismic waves comprises k successive firings, where k is an integer greater than 1, including a first firing performed with a seismic source submerged at a depth $d_1$ and k−1 subsequent firings with seismic sources submerged at respective depths $d_2, \ldots, d_k$,
   wherein the k firings of said emission sequence are coordinated in such a way that, for each integer i lying between 2 and k, the $i^{th}$ firing of the emission sequence is performed with a delay of $(d_{i-1}+d_i)$·cos θ/V with respect to the $(i-1)^{th}$ firing of the emission sequence, and wherein the depth D associated with said emission sequence is the sum of the k depths $d_1, d_2, \ldots, d_k$.

8. The method for acquiring seismic data as claimed in claim 7, wherein the firing depths are identical in said emission sequence, i.e. $d_1=d_2= \ldots =d_k$=D/k.

9. The method for acquiring seismic data as claimed in claim 7, wherein seismic sources are submerged at n different depths, where n is an integer greater than 1, wherein a plurality of independent seismic wave emission sequences are successively produced with the aid of said seismic sources and are associated with different depths D.

10. The method for acquiring seismic data as claimed in claim 9, wherein $2^n-1$ independent seismic wave emission sequences are successively produced with the aid of the seismic sources submerged at n different depths, the $2^n-1$ emission sequences including, for each integer i lying between 1 and n, $C_n^i$=n!/[i!(n−i)!] independent emission sequences each consisting of i coordinated firings from i sources situated at different depths.

11. The method for acquiring seismic data as claimed in claim 1, wherein the emission of the seismic waves comprises p independent emission sequences each associated with a respective depth $D_1, D_2, \ldots D_p$, p being an integer greater than 1, wherein gathering the seismic signal comprises recording p reception sequences respectively subsequent to said p emission sequences, and wherein processing the seismic signal comprises respectively summing said terms for each of the p reception sequences recorded and combining the p sums obtained.

12. The method for acquiring seismic data as claimed in claim 11, wherein the number p of emission sequences is between 5 and 20.

13. The method for acquiring seismic data as claimed in claim 11, further comprising:

measuring the seismic waves emitted by a hydrophone submerged under each seismic source and aligned along the direction of angle $\theta=0$;

applying to the seismic waves measured by the hydrophone a summation processing identical to that applied to the seismic signal;

verifying a convergence criterion on a signal resulting from the processing applied to the seismic waves measured by the hydrophone; and stopping the emission sequences when the convergence criterion is satisfied.

14. The method for acquiring seismic data as claimed in claim 13, wherein the convergence criterion relates to a spectral shape of a signal resulting from the processing applied to the seismic waves measured by the hydrophone.

15. The method for acquiring seismic data as claimed in claim 13, wherein the convergence criterion relates to a signal-to-noise ratio of a signal resulting from the processing applied to the seismic waves measured by the hydrophone.

16. The method for acquiring seismic data as claimed in claim 1, wherein the direction of emission is vertical, that is to say $\theta=0$.

17. A device for processing a seismic signal gathered subsequent to emission of seismic waves with the aid of at least one submerged seismic source and to propagation of the seismic waves in the subsoil, the seismic waves having been emitted along a direction of emission forming an angle $\theta$ with the vertical and in the form of at least one emission sequence associated with a respective depth, the gathered seismic signal comprising a reception sequence corresponding respectively to each emission sequence, the device comprising a processor for summing a plurality of terms including the seismic signal of a reception sequence corresponding to an emission sequence and the seismic signal of said reception sequence delayed by $\Delta T = 2D \cdot \cos \theta/V$, where V is a speed of propagation of the seismic waves in water and D is the depth associated with said emission sequence.

18. The seismic signal processing device as claimed in claim 17, wherein the summed terms for a reception sequence comprise n times the seismic signal of said reception sequence and, for each integer i lying between 1 and n−1, n−i times the seismic signal of said reception sequence delayed by $i \cdot \Delta T$, where n is an integer greater than 1.

19. The seismic signal processing device as claimed in claim 17, configured to process p reception sequences respectively subsequent to p emission sequences each associated with a respective depth $D_1, D_2, \ldots D_p$, p being an integer greater than 1, the processor being configured to respectively sum said terms for each of the p reception sequences recorded and to combine the p sums obtained.

20. The device for acquiring seismic data as claimed in claim 19, wherein the number p of reception sequences is between 5 and 20.

21. A computer-readable storage medium having a program stored thereon for running in a device for processing a seismic signal gathered subsequent to emission of seismic waves with the aid of at least one submerged seismic source and to propagation of the seismic waves in the subsoil, the seismic waves having been emitted along a direction of emission forming an angle $\theta$ with the vertical and in the form of at least one emission sequence associated with a respective depth, the gathered seismic signal comprising a reception sequence corresponding respectively to each emission sequence, the program comprising instructions for, when the program is run in a processor of said device, summing a plurality of terms including the seismic signal of a reception sequence corresponding to an emission sequence and the seismic signal of said reception sequence delayed by $\Delta T = 2D \cdot \cos \theta/V$, where V is a speed of propagation of the seismic waves in water and D is the depth associated with said emission sequence.

22. A method for emitting seismic waves in a maritime environment along a direction of emission forming an angle $\theta$ with the vertical, with the aid of at least one submerged seismic source, the method comprising:

performing a first firing from a first emission position submerged at a depth $d_1$; and performing a second firing from a second emission position submerged at a depth $d_2$, with a delay equal to $(d_1+d_2) \cdot \cos \theta/V$ with respect to the first firing, where V is a speed of propagation of the seismic waves in water.

23. The method for emitting seismic waves as claimed in claim 22, wherein the first and second emission positions are collocated, i.e. $d_1=d_2=d$.

24. The method for emitting seismic waves as claimed in claim 22, comprising, for each integer i lying between 2 and k, where k is an integer greater than 2:

performing an $i^{th}$ firing from an $i^{th}$ emission position submerged at a depth $d_i$, with a delay equal to $(d_{i-1}+d_i) \cdot \cos \theta/V$ with respect to the $(i-1)^{th}$ firing.

25. The method for emitting seismic waves as claimed in claim 24, wherein the emission positions are collocated, i.e. $d_1=d_2=\ldots=d_k=d$.

26. The method for emitting seismic waves as claimed in claim 22, wherein the direction of emission is vertical, that is to say $\theta=0$.

27. A method for acquiring seismic data relating to a subsoil zone situated under the sea, the method comprising:

emitting seismic waves along a direction of emission forming an angle $\theta$ with the vertical, with the aid of at least one submerged seismic source;

gathering a seismic signal subsequent to emission of the seismic waves and to propagation of the seismic waves in the subsoil; and processing the seismic signal, wherein emitting the seismic waves comprises k successive firings, where k is an integer greater than 1, including a first firing performed at a depth $d_1$ and k−1 subsequent firings at respective depths $d_2, \ldots, d_k$, and wherein, for each integer i between 2 and k, the $i^{th}$ firing is performed with a delay of $(d_{i-1}+d_i) \cdot \cos \theta/V$ with respect to the $(i-1)^{th}$ firing, where V is a speed of propagation of the seismic waves in water.

* * * * *

UNITED STATES PATENT AND TRADEMARK OFFICE
CERTIFICATE OF CORRECTION

PATENT NO. : 9,952,342 B2
APPLICATION NO. : 14/894889
DATED : April 24, 2018
INVENTOR(S) : Jacques Blanco et al.

It is certified that error appears in the above-identified patent and that said Letters Patent is hereby corrected as shown below:

In the Claims

Column 14, Line 65:
Delete "$_u$" in the formula and insert "$_i$" in its place.

Signed and Sealed this
Twelfth Day of June, 2018

Andrei Iancu
*Director of the United States Patent and Trademark Office*